(12) United States Patent
Topchy et al.

(10) Patent No.: US 10,708,612 B1
(45) Date of Patent: Jul. 7, 2020

(54) APPARATUS AND METHODS FOR WATERMARKING USING STARTING PHASE MODULATION

(71) Applicant: The Nielsen Company (US), LLC, New York, NY (US)

(72) Inventors: Alexander Topchy, New Port Richey, FL (US); Vladimir Kuznetsov, Ellicott City, MD (US); Jeremey M. Davis, New Port Richey, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 16/231,108

(22) Filed: Dec. 21, 2018

(51) Int. Cl.
*H04N 19/467* (2014.01)
*H04N 21/442* (2011.01)
(Continued)

(52) U.S. Cl.
CPC ....... *H04N 19/467* (2014.11); *H04L 27/2032* (2013.01); *H04L 67/22* (2013.01); *H04N 21/44222* (2013.01); *H04N 21/8358* (2013.01)

(58) Field of Classification Search
CPC .. H04N 19/467; H04L 27/2032; G10L 19/018
See application file for complete search history.

(56) References Cited

U.S. PATENT DOCUMENTS 6,741,723 B2    5/2004   Yamakage et al.
6,952,486 B2   10/2005   Yamakage et al.
(Continued)

FOREIGN PATENT DOCUMENTS

KR   20040001213 A   1/2004
KR   20060022735 A   3/2006
KR   20120128147 A   11/2012

OTHER PUBLICATIONS

Mowalee et al., "MATLAB Toolbox," Single Channel Phase-Aware Signal Processing in Speech Communication: Theory and Practice, First Edition, Dec. 2016, John Wiley & Sons, Ltd., 3 pages.
(Continued)

*Primary Examiner* — Thai Q Tran
*Assistant Examiner* — Girumsew Wendmagegn
(74) *Attorney, Agent, or Firm* — Hanley, Flight & Zimmerman, LLC

(57) ABSTRACT

Methods, apparatus, systems and articles of manufacture are disclosed for watermarking using starting phase modulation. An example method disclosed herein includes calculating a first instantaneous phase value for a first watermark component of a watermarked media signal at a first time, calculating a second instantaneous phase value for a second watermark component, determining a first sum of differences for the first and second instantaneous phase values relative to a first possible starting phase value, determining a second sum of differences for the first and second instantaneous phase values relative to a second possible starting phase value, selecting a corresponding one of the first possible starting phase value or the second possible starting phase value to be a starting phase value, decoding a bit value corresponding to the starting phase value, determining a payload based on the bit value and a symbol represented by watermark components.

20 Claims, 10 Drawing Sheets

(51) Int. Cl.
*H04L 29/08* (2006.01)
*H04L 27/20* (2006.01)
*H04N 21/8358* (2011.01)

(56) References Cited

U.S. PATENT DOCUMENTS

| | | | |
|---|---|---|---|
| 7,131,007 | B1 | 10/2006 | Johnston et al. |
| 7,369,678 | B2 | 5/2008 | Rhoads |
| 8,726,031 | B2 | 5/2014 | Wabnik et al. |
| 2003/0091213 | A1 | 5/2003 | Yamakage et al. |
| 2004/0030899 | A1 | 2/2004 | Lee et al. |
| 2004/0184637 | A1 | 9/2004 | Yamakage et al. |
| 2013/0232340 | A1 | 9/2013 | Wabnik et al. |
| 2015/0340045 | A1* | 11/2015 | Hardwick ............. G10L 19/018 704/205 |
| 2017/0371960 | A1 | 12/2017 | Srinivasan et al. |
| 2018/0286417 | A1* | 10/2018 | Hardwick ............. G10L 19/018 |

OTHER PUBLICATIONS

Mowalee, "Introduction: Phase Processing, History," Single Channel Phase-Aware Signal Processing in Speech Communication: Theory and Practice, First Edition, Dec. 2016, John Wiley & Sons, Ltd., 31 pages.

Mowalee, "Fundamentals of Phase-Based Signal Processing," Single Channel Phase-Aware Signal Processing in Speech Communication: Theory and Practice, First Edition, Dec. 2016, John Wiley & Sons, Ltd., 38 pages.

Mowalee et al., "Phase Processing for Single-Channel Source Separation," Single Channel Phase-Aware Signal Processing in Speech Communication: Theory and Practice, First Edition, Dec. 2016, John Wiley & Sons, Ltd., 36 pages.

Mowalee, "Phase-Aware Speech Quality Estimation," Single Channel Phase-Aware Signal Processing in Speech Communication: Theory and Practice, First Edition, Dec. 2016, John Wiley & Sons, Ltd., 31 pages.

Mowalee, "Conclusion and Future Outlook," Single Channel Phase-Aware Signal Processing in Speech communication: Theory and Practice, First Edition, Dec. 2016, John Wiley & Sons, Ltd., 10 pages.

Kulmer et al., "Phase Estimation Fundamentals," Single Channel Phase-Aware Signal Processing in Speech Communication: Theory and Practice, First Edition, Dec. 2016, John Wiley & Sons, Ltd., 41 pages.

Dong et al., "Data Hiding via Phase Manipulation of Audio Signals," IEEE Conference on Acoustics, Speech, and Signal Processing, Jun. 2004, 4 pages.

Walker, "R&D White Paper: Audio Watermarking," British Broadcasting Corporation, Aug. 2004, 17 pages.

Stahl et al., "Phase Processing for Single-Channel Speech Enhancement," Single Channel Phase-Aware Signal Processing in Speech Communication: Theory and Practice, First Edition, Dec. 2016, John Wiley & Sons, Ltd., 29 pages.

International Searching Authority, "International Search Report", issued in connection with International Application No. PCT/US2019/066612, dated Apr. 24, 2020 (4 pages).

International Searching Authority, "Written Opinion, ", issued in connection with International Application No. PCT/US2019/066612, dated Apr. 24, 2020 (4 pages).

International Searching Authority, "Notification of the International Search Report and Written Opinion", issued in connection with International Application No. PCT/US2019/066612, dated Apr. 24, 2020 (2 pages).

\* cited by examiner

```
//STORE SMALLEST VALUE OF SUM OF DIFFERENCES FOR STARTING PHASE OF 0//
Q0=INF.

//STORE SMALLEST VALUE OF SUM OF DIFFERENCES FOR STARTING PHASE OF PI//
Q1=INF

WHILE t>0
        //DECREMENT ANALYSIS TIME//
        t=t-δt

//UPDATE INSTANTANEOUS PHASE VALUES//
        Φ_i(t)=(Φ_i(t)-2πf_iδt)mod(2π)

//DETERMINE SUM OF DIFFERENCES OF INSTANTANEOUS PHASE
        VALUES AND STARTING PHASE OF 0//
        Q(t,Φ_o=0) = ∑_i (Φ_i(t)-0)²

//DETERMINE SUM OF DIFFERENCES OF INSTANTANEOUS PHASE
        VALUES AND STARTING PHASE VALUE OF π//
        Q(t,Φ_o=π) = ∑_i (Φ_i(t)-π)²

//DETERMINE IF EITHER SUM TERM SATISFIES MAX. MATCH DIFF.
        THRESHOLD//
        IF Q(t,Φ_o=0) <Qmin OR Q(t,Φ_o=π) < Qmin
            BREAK
        END //UPDATE Q0, Q1 TRACKING MINIMUM SUM TERMS CALCULATED
        IF Q(t,Φ_o=0)<Q0
            Q0=Q(t,Φ_o=0)
        END IF Q(t,Φ_o=π)<Q1
            Q1=Q(t,Φ_o=π)
        END //DETERMINE BIT VALUE BASED ON STARTING PHASE
IF Q1<Q0
    BIT=0
IF Q0<Q1
    BIT=1
END
```

APPARATUS AND METHODS FOR WATERMARKING USING STARTING PHASE MODULATION

FIELD OF THE DISCLOSURE

This disclosure relates generally to media monitoring, and, more particularly, to apparatus and methods for watermarking using starting phase modulation.

BACKGROUND

Media, such as a television broadcast, may be encoded with watermarks that, when detected, are decoded to identify the media that was presented.

BRIEF DESCRIPTION OF THE DRAWINGS

FIG. 6 is example code for implementing the watermark decoding process described in connection with FIGS. 5A-5B.

The figures are not to scale. In general, the same reference numbers will be used throughout the drawing(s) and accompanying written description to refer to the same or like parts.

DETAILED DESCRIPTION

Figure 1:
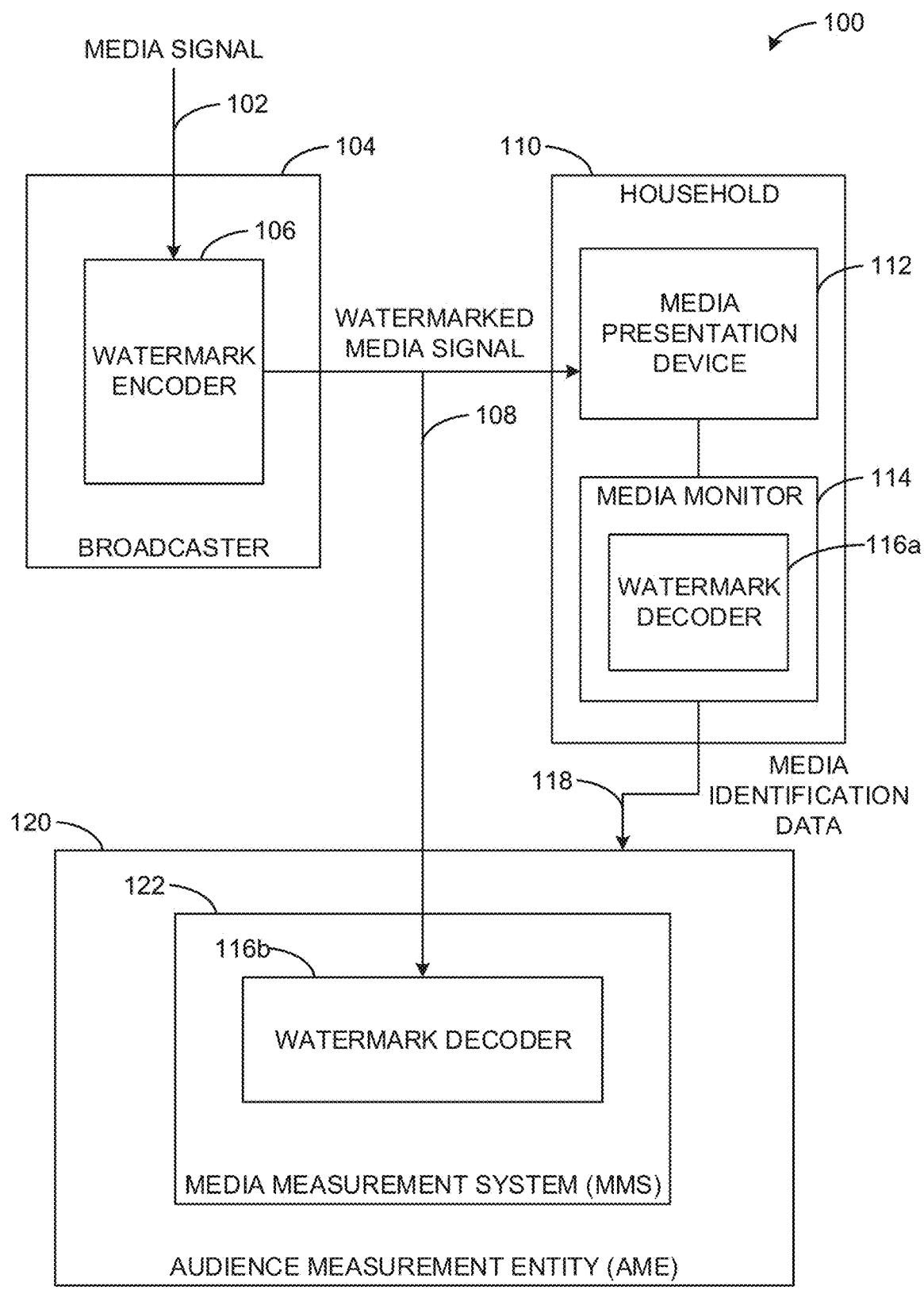
FIG. 1 is a block diagram of an example environment for watermarking using starting phase modulation.

Audience measurement entities desire knowledge on how users interact with media devices such as smartphones, tablets, laptops, smart televisions, etc. In particular, media monitoring companies want to monitor media presentations made at the media devices to, among other things, monitor exposure to advertisements, determine advertisement effectiveness, determine user behavior, identify purchasing behavior associated with various demographics, etc.

Watermarking is a technique used to identify media such as television broadcasts, radio broadcasts, advertisements (television and/or radio), downloaded media, streaming media, prepackaged media, etc. Existing watermarking techniques identify media by embedding one or more codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Watermarks are encoded into media signals by selecting audio frequency ranges that have may have minimal influence on a user's perception of the media signal (e.g., as determined empirically via psychoacoustics) and modifying the media signal in this frequency range. Watermarks typically include a plurality of watermark components (e.g., symbols, tones, etc.). The watermark components are embedded in the media signal in a manner that is ideally imperceptible to a listener, but discernable when audio characteristics are analyzed during watermark decoding. One approach to audio watermarking is based on embedding short tones (e.g., sine waves) of particular frequencies and amplitudes, where the choice of tones is modulated by the watermark information payload. Specific tone frequency ranges and/or tone amplitude values can be associated with different values of watermark components. For example, an amplitude value satisfying a threshold may be observed at a tone frequency where a watermark component is expected. Based on the frequency range and amplitude value, a number (or other code representation) can be determined and utilized to determine identifying information per the aforementioned watermark reference table(s).

However, many frequency ranges and/or amplitude values cannot be utilized to convey watermark components, as the result would be humanly perceptible and/or difficult to detect during decoding (e.g., due to a low signal-to-noise ratio). Therefore, the capacity of information that can be conveyed in watermark components by merely actuating amplitude values in frequency ranges is limited. In recent years, there is a demand to increase the information capacity of watermarks. For example, an increase in watermark capacity can support longer timestamps, telemetry of the encoder, and incorporation of flags to signal media monitors to begin, end, or modify decoding processes. This information needs to be delivered substantially at the same time (e.g., within tenths of a second) as the existing information that is conveyed in watermarks to avoid elongating the overall watermark duration. Hence, there is a demand for not merely increasing the overall amount of information conveyed, but there is demand for increasing information density in watermark components.

As previously described, media signals can be characterized based on amplitude of the media signals and frequency values. Media signals can additionally be characterized based on a third property, phase. Phase refers to position at a time value of a media signal. Instantaneous phase refers to the value of the media signal at a specific point in time (e.g., at a current time of analysis). In some examples, there may be a phase difference between watermark components embedded in a media signal. For example, watermark components are often embedded as sine waves with particular frequency and amplitude values, as previously discussed. Two separate watermark components may thus be represented as two separate sine waves in the media signal. In some examples, these sine waves each begin at the same time and with the same value (e.g., a voltage value of zero, a decibel value of zero, etc.). Depending on the frequency of the sine waves, the instantaneous phase values will diverge after the starting time. For example, a high-frequency sine wave will have instantaneous phase values that change rapidly over time relative to a low-frequency sine wave. Thus, aside from providing an additional media signal characteristic that is directly linked to frequency, instantaneous phase values of the individual watermark components, if taken in isolation, are not readily capable of carrying additional information for the watermark. Conventional watermarking techniques thus ignore individual phase values when encoding and decoding watermark components.

Example methods, apparatus, systems and articles of manufacture (e.g. physical storage media) for media measurement using starting phase modulation are disclosed herein. Example disclosed media measurement techniques enable watermark components to carry additional information by modulating the starting phase value of one or more of the watermark components. Example techniques disclosed herein encode a plurality of watermark components with a pre-determined starting phase value representing an information bit value. For example, a first starting phase value (e.g., zero, π, −π, etc.) can be utilized to represent a first bit value (e.g., zero) and a second starting phase value can be used to represent a second bit value (e.g., one).

In example methods, apparatus, systems and articles of manufacture (e.g. physical storage media) disclosed herein for decoding/detection of watermark symbols in the media signals, watermark components are analyzed at arbitrary sample periods in media signals (e.g., not specifically starting at the beginning of the watermark components), as it is difficult to determine specifically when a watermark symbol starts. Example techniques disclosed herein perform calculations at the arbitrary sample periods and determine whether phase values for the watermark components at the arbitrary sample periods are sufficiently close to starting phase values selected to carry information (e.g., e.g., zero, π, −π, etc.). In example techniques disclosed herein, if the analyzed instantaneous phase values do not appear to converge and represent starting phase values, the analysis steps back in time and continues analyzing additional sample periods until the starting phase of the watermark components is determined. Once the starting phase has been determined, a bit value can be determined based on the starting phase of the watermark components. In some example techniques disclosed herein, only watermark components with the strongest signals (e.g., based on signal-to-noise ratio) are selected for analysis during the starting phase bit decoding process.

Example techniques disclosed herein enable watermarks to include more information by modulating start phase values of watermark components, which is imperceptible to a human ear, but perceptible to a watermark decoder utilizing analysis techniques disclosed herein. Techniques disclosed herein improve watermark information density in a manner that has no potential perceptible impact on any other aspect of the media signal. Additionally, techniques disclosed herein are backwards-compatible with existing watermark decoders, as the amplitude and frequency characteristics of watermark components can still be analyzed to determine watermark symbols for watermarks encoded utilizing techniques disclosed herein. Thus, watermarking techniques disclosed herein enable decoding of additional information (e.g., via a starting phase bit) when decoded at a decoder to decode watermarks encoded utilizing starting phase modulation as described herein, without compromising the remaining information carried by the watermark (e.g., from frequency and/or amplitude characteristics).

FIG. 1 is a block diagram of an example environment 100 for watermarking using starting phase modulation. The environment 100 includes an example media signal 102, an example media distributor 104, an example watermark encoder 106, an example watermarked media signal 108, an example household 110, an example media presentation device 112, an example media monitor 114, an example first watermark decoder 116a, an example second watermark decoder 116b, example media identification data 118, an example audience measurement entity (AME) 120, and an example media measurement system (MMS) 122.

The example media signal 102 of the illustrated example of FIG. 1 is an audio, video, and/or audiovisual signal conveying media. In some examples, the media signal 102 is generated by a content creator (e.g., a production studio, an individual creator, an artist, etc.), a content distributor, or another entity and is provided to the media distributor 104 for transmission to a broader audience. In some examples, the media distributor 104 itself creates the media signal 102. The media signal 102 can be conveyed wirelessly (e.g., via a network, via an antenna, etc.) or via a direct physical connection (e.g., via a cable).

The example media distributor 104 of the illustrated example of FIG. 1 is an entity for transmitting media signals to a broader audience. For example, the media distributor 104 can receive a plurality of media signals conveying media and utilize transmission technology (e.g., antennas, satellites, cable, the Internet, etc.) to make the media signals available to a large audience. In some examples, the media distributor 104 includes the watermark encoder 106 to encode watermarks into the media signal 102, thereby generating the watermarked media signal 108. In some examples, the watermarks may be embedded in the media signal 102 elsewhere (e.g., at a content creator, at a content distributor, at the AME 120, etc.).

The example watermark encoder 106 of the illustrated example of FIG. 1 encodes (e.g., embeds, inputs, etc.) watermarks into the media signal 102 for subsequent identification of media conveyed by the media signal 102. The watermark encoder 106 may be configured by the AME 120 to enable the second watermark decoder 116b at the AME 120 (e.g., at the MMS 122) to readily decode the watermarks. For example, the AME 120 may provide an algorithm, a code mapping, or other tool utilized by the watermark encoder 106 for generating the watermarked media signal 108. The watermark encoder 106 of the illustrated example embeds watermarks into the media signal 102 by embedding numerous watermark components consisting of altered amplitude and starting phase values within specific frequency ranges of the media signal 102. In some examples, the watermark encoder 106 alters specific media signal characteristics such that the watermarks are sufficiently hidden (e.g., inaudible, invisible, etc.) to the audience, but are still detectable and identifiable by the AME 120. The watermark encoder 106 can embed one or more watermarks corresponding to a program identifier, a station identifier, a timestamp, and/or any other information that may be useful in identifying the media conveyed in the media signal 102. Further detail of the watermark encoder 106 and the techniques performed by the watermark encoder 106 is described in connection with FIG. 2.

The example watermarked media signal 108 of the illustrated example of FIG. 1 is the media signal 102 after being encoded with one or more watermark(s). The watermarked media signal 108 is broadcast to an audience utilizing transmission technology (e.g., antennae, networks, cables, etc.) of the media distributor 104.

The example household 110 of the illustrated example of FIG. 1 is a location where media is consumed and media monitoring (e.g., via the media monitor 114) is performed. The household 110 includes the media presentation device 112 and the media monitor 114. In some examples, the household 110 is a panelist household (e.g., belonging to a person enrolled in a monitoring program associated with the AME 120). As used herein, the term panelist refers to users registered on panels maintained by a ratings entity (e.g., the AME 120). The household 110 can be any location where media monitoring is performed.

The example media presentation device 112 of the illustrated example of FIG. 1 is a device that accesses the watermarked media signal 108 for presentation. In some examples, the media presentation device 112 is capable of directly presenting media (e.g., via a display), while in other examples, the media presentation device 112 presents the media on separate media presentation equipment (e.g., speakers, a display, etc.). The media presentation device 112 may be, for example, a television, which may be directly capable of presenting media (e.g., via an integrated and/or connected display and speakers). The household 110 may include any type or number of media device(s) that access the watermarked media signal 108. In some examples, the media presentation device 112 is connected (e.g., via a wireless connection and/or a wired connection) with the media monitor 114.

The example media monitor 114 of the illustrated example of FIG. 1 performs media measurement tasks. In some examples, the media monitor 114 records media presented on the media presentation device 112 (e.g., via a microphone). In some such examples, the media monitor 114 is a standalone device separate from the media presentation device. For example, the media monitor 114 may be wirelessly connected to the media presentation device 112 and/or removably connected (e.g., via connections such as HDMI, USB, Ethernet, or other connections) to the media presentation device 112. In some examples, the media monitor 114 is installed in (e.g., integral to) the media presentation device 112. For example, the media monitor 114 may include one or more hardware and/or software components embedded in the media presentation device 112. The media monitor 114 of the illustrated example generates the media identification data 118 based on the watermarked media signal 108 presented by the media presentation device 112. In some examples, the media monitor 114 is a portable device to be carried by a panelist.

The example first watermark decoder 116a and the example second watermark decoder 116b of the illustrated example of FIG. 1 analyzes characteristics of the watermarked media signal 108 to decode watermarks embedded in the watermarked media signal 108. The first and second watermark decoders 116a, 116b may be the same component (e.g., consist of the same hardware and/or software), but are each illustrated separately to represent the possibility that the watermarked media signal 108 is decoded at the media monitor 114 at the household 110 as well as the possibility that the watermarked media signal 108 is decoded at the MMS 122 of the AME 120. For example, the AME 120 may utilize the second watermark decoder 116b to ensure that watermarks are encoded in the media signal 102 (e.g., to enable accurate media monitoring). The media monitor 114 includes the first watermark decoder 116a to identify media conveyed in the watermarked media signal 108 and generate the media identification data 118.

The first and second watermark decoders 116a, 116b can generate a characteristic representation of the watermarked media signal 108 to enable identification of watermark components in the watermarked media signal 108. For example, the first and second watermark decoders 116a, 116b can convert the watermarked media signal 108 using a Fast Fourier Transform (FFT), a Discrete Fourier Transform (DFT), or other type of transform to convert the watermarked media signal 108 from the time domain to the frequency domain. The first and second watermark decoders 116a, 116b of the illustrated example identify and decode watermark components based on frequency, amplitude, and phase values of the watermarked media signal 108. For example, the first and second watermark decoders 116a, 116b can analyze specific frequency ranges that are determined to be suitable for embedding watermarks to determine whether watermark components are present. The first and second watermark decoders 116a, 116b of the illustrated example determine starting phase values of one or more watermark components of the watermarked media signal 108, and subsequently determine information (e.g., represented as bit values, code values, etc.) based on the starting phase values. Further detail of the first and second watermark decoders 116a, 116b is illustrated and described in association with the example watermark decoder 116 of FIG. 3.

The media identification data 118 of the illustrated example of FIG. 1 is data corresponding to media detected by the media monitor 114. The media identification data 118 can include one or more media presentation records communicating media presented via the media presentation device 112, or communicating identifying information associated with the watermarked media signal 108 (e.g., a program name, a station name, a channel name, etc.). In some examples, the media identification data 118 includes timestamps, user identification data (e.g., a panelist ID), media presentation device data (e.g., a device ID, a device name, a device status, etc.), and/or media monitoring device data (e.g., a power level, a connection status, etc.). In some examples, the media identification data 118 is regularly communicated to the AME 120. In some examples, the media identification data 118 is stored locally at the media monitor 114 and communicated to the AME 120 upon request (e.g., in response to a query from the AME 120).

The AME 120 of the illustrated example of FIG. 1 is an entity responsible for collecting media monitoring information. The AME 120 collects media monitoring data (e.g., such as the media identification data 118) from a plurality of monitors to determine, among other things, media consumption habits, advertising exposure, audience size, etc. The AME 120 of the illustrated example includes the MMS 122. In some examples, the MMS 122 is at a separate location and/or is a separate entity from the MMS 122. For example, the MMS 122 may be operated by a separate company or organization, which then provides (e.g., as a service) aggregate media monitoring data to the AME 120.

The MMS 122 of the illustrated example of FIG. 1 is a location that observes and/or collects data regarding media signals. The MMS 122 is utilized by the AME 120 to track aggregate media information at a specific location. For example, the MMS 122 may include a wide variety of media signal reception technologies (e.g., antennae, satellite receivers, networks, etc.) to optimize a number of media signals accessed. The MMS 122 can verify programming (e.g., check broadcast media signals with expected programming, expected advertisements, etc.) based on metadata, watermarks (e.g., decoded by the second watermark decoder 116*b*), signatures, and/or any other identification technique.

In an example operation, the media signal 102 is accessed by the media distributor 104 at the watermark encoder 106, which encodes watermarks in the media signal 102 to generate the watermarked media signal 108. The household 110 accesses the watermarked media signal 108 via the media presentation device 112, which is monitored by the media monitor 114. The first watermark decoder 116*a* of the media monitor 114 decodes watermarks embedded in the watermarked media signal 108 and generates the media identification data 118. The AME 120 receives the media identification data and additionally or alternatively accesses the watermarked media signal 108 at the MMS 122, which includes a second watermark decoder 116*b* to decode the watermarks embedded in the watermarked media signal 108.

Figure 2:
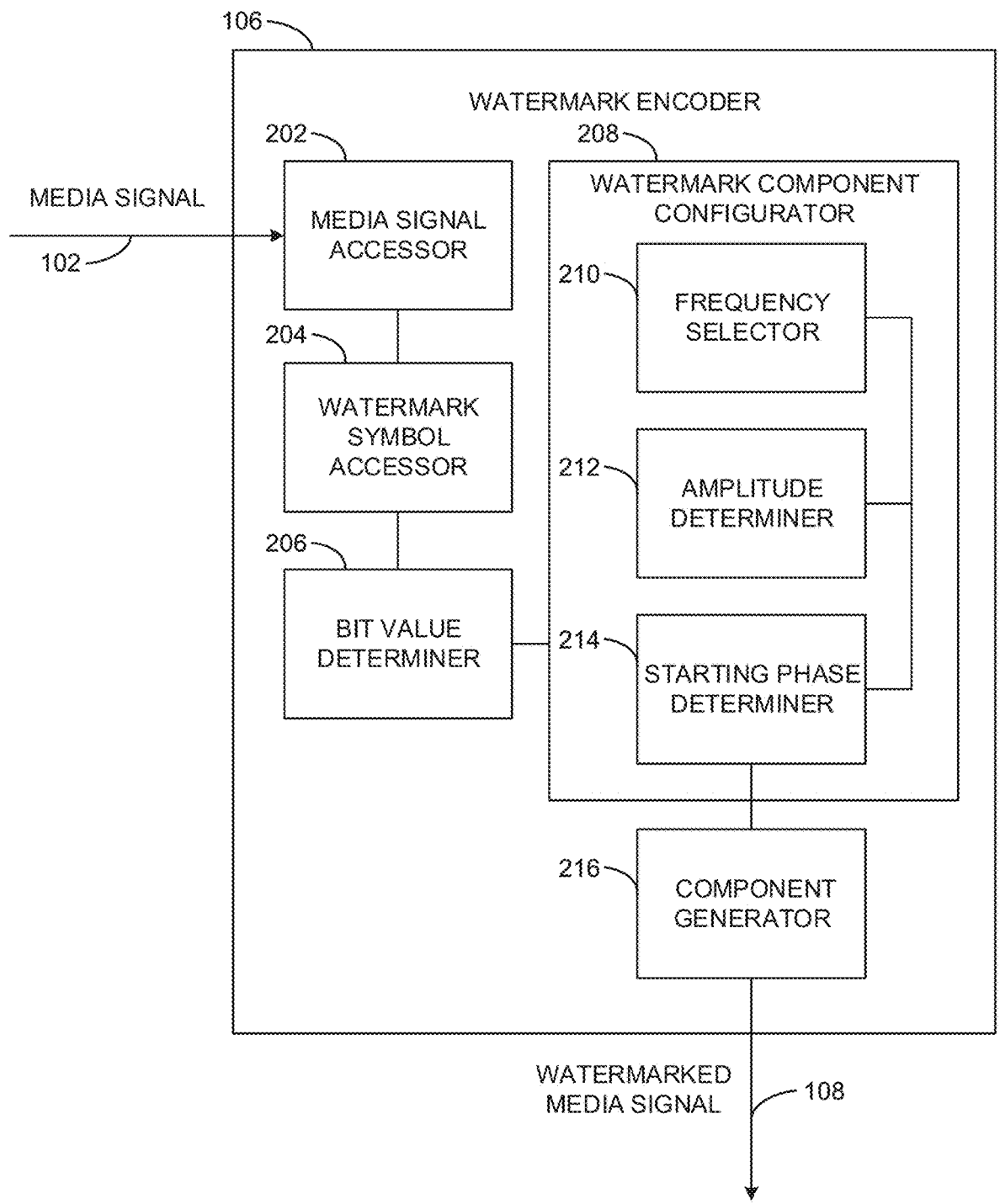
FIG. 2 is a block diagram of the example watermark encoder of FIG. 1 to encode watermarks using starting phase modulation in accordance with the teachings of this disclosure.

FIG. 2 is a block diagram of an example implementation of the watermark encoder 106 of FIG. 1 to encode watermarks using starting phase modulation in accordance with the teachings of this disclosure. The watermark encoder 106 includes an example media signal accessor 202, an example watermark symbol and auxiliary information accessor 204, an example bit value determiner 206, an example watermark component configurator 208, an example frequency selector 210, an example amplitude determiner 212, an example starting phase determiner 214, and an example component generator 216.

The example media signal accessor 202 of the illustrated example of FIG. 2 accesses the media signal 102. For example, the media signal accessor 202 may include transmission technology (e.g., antennae, network(s), cable(s), etc.). In some examples, the media signal accessor 202 may access identifying information (e.g., metadata, signatures, etc.) associated with the media signal 102, which can be utilized by the watermark symbol and auxiliary information accessor 204 to determine watermarks to be encoded in the media signal 102.

The example watermark symbol and auxiliary information accessor 204 of the illustrated example of FIG. 2 accesses watermark symbols and other auxiliary information to be conveyed in one or more watermarks in the media signal 102. In some examples, the watermark symbol and auxiliary information accessor 204 determines watermark symbols to be encoded into the media signal 102 based on identifying information (e.g., metadata, signatures, etc.) provided by the media signal accessor 202, communicated by the AME 120, or communicated by an external entity (e.g., a content creator, a publisher, etc.). In some examples, the watermark symbol is directly communicated to the media distributor 104 by the AME 120. Additionally or alternatively, the watermark symbol and auxiliary information accessor 204 determines auxiliary information to be conveyed with the watermark by modulating starting phase values of watermark components. For example, the auxiliary information may include timestamp information, flags for signaling decoding, etc. The watermark symbol and auxiliary information accessor 204 of the illustrated example can access watermark symbols based on pre-determined watermark symbols (e.g., stored in a reference watermark table) corresponding to identifying information. In some examples, the watermark symbol and auxiliary information accessor 204 algorithmically determines watermark symbols based on the identifying information. In some examples, watermark symbols accessed by the watermark symbol and auxiliary information accessor 204 include watermark symbols and auxiliary information determined by the media distributor 104 to enable subsequent identification of information specific to the media distributor 104 during media measurement (e.g., identification of a station name, identification of a transmission type, etc.). The watermark symbol and auxiliary information accessor 204 of the illustrated example communicates watermark symbols and/or auxiliary information to the bit value determiner 206.

The example bit value determiner 206 of the illustrated example of FIG. 2 determines bit values corresponding to the watermark symbols and/or auxiliary information to be encoded in the media signal 102. For example, for ones of the watermark symbols accessed by the watermark symbol and auxiliary information accessor 204, the bit value determiner 206 determines a plurality of bits to represent the ones of the watermark symbols. In some examples, the bit value determiner 206 sections watermark symbols into a plurality of watermark components (e.g., individual "tones") and determines bit values to represent the watermark components. For example, a first bit value may be represented by an amplitude of a watermark component, a second bit may be represented by a frequency value and/or range of the watermark component, and/or a third bit may be represented by a starting phase value of the watermark component. In some examples, the bit value represented by the starting phase value of the watermark component corresponds to auxiliary information that is provided in addition to a watermark symbol. By utilizing the starting phase value bit for auxiliary information that is provided in addition to watermark symbols, decoders which are not capable of determining starting phase value bits can still determine watermark symbols, thus enabling a backwards compatible encoding system. In some examples, however, the starting phase value bit can be utilized as part of the watermark symbol. As used herein, watermark components are divisions (e.g., portions, sections, etc.) of watermark symbols. A plurality of watermark components are encoded into the media signal 102 to represent a watermark symbol, which, when decoded, provides identifying information pertaining to the media signal 102.

The example watermark component configurator 208 of the illustrated example of FIG. 2 determines signal characteristics to represent the bit values determined by the bit value determiner 206. To accomplish this, the watermark component configurator 208 includes the frequency selector 210, the amplitude determiner 212, and the starting phase determiner 214.

The example frequency selector 210 of the illustrated example of FIG. 2 selects frequency ranges within the media signal 102 where watermark components can be embedded. For example, the frequency selector 210 can analyze the media signal 102 and determine frequency ranges that can be altered (e.g., by inserting the watermark component) without a perceptible difference for a listener. This is sometimes referred to as frequency masking. In some examples, the frequency selector 210 analyzes specific frequency ranges that are known to be difficult to perceive by a human ear. The frequency selector 210 selects one or more frequency ranges within which one or more watermark components are to be embedded. In some examples, the frequency selector 210 selects the one or more frequency ranges based on whether or not the media signal 102 already has a substantial amplitude within the specific frequency range. For example, the frequency selector 210 can select a frequency range that is known (e.g., via psychoacoustic studies) to be suitable for embedding watermark components and determine that the media signal 102 has an amplitude exceeding a signal threshold (representing the highest allowable amplitude of the media signal 102 that can be present within a same frequency range as a watermark component). In response to the amplitude of the media signal 102 exceeding the signal threshold, the frequency selector 210 indicates that the analyzed frequency range is not suitable for embedding a watermark component, as a signal-to-noise ratio for the watermark component in the analyzed frequency range would be too low, making decoding the watermark component difficult.

In some examples, in response to an analyzed frequency range being both (a) suitable for embedding the watermark component based on a low probability of auditory perception and (b) the media signal 102 not having amplitude in excess of the signal threshold, the frequency selector 210 can select the analyzed frequency range for embedding a watermark component. In response to selecting a frequency range for embedding a watermark component, the frequency selector 210 can communicate the frequency range to the amplitude determiner 212, the starting phase determiner 214, and/or the component generator 216.

The example amplitude determiner 212 of the illustrated example of FIG. 2 determines amplitude values for watermark components to be embedded in the media signal 102. The amplitude determiner 212 of the illustrated example determines an amplitude value based on a bit value to be encoded as part of a watermark component. In some examples, the amplitude determiner 212 additionally or alternatively determines an amplitude value to represent the bit value based on a current amplitude of the media signal 102 in the frequency range selected by the frequency selector 210. In some examples, the amplitude determiner 212 selects an amplitude value for the watermark component based on a target signal-to-noise ratio (SNR), to ensure that the watermark component is readily detectable at the watermark decoder 116. In response to determining an amplitude value for a watermark component to be embedded in the media signal 102, the amplitude value is communicated to the component generator 216.

The example starting phase determiner 214 of the illustrated example of FIG. 2 determines starting phase values for one or more watermark components to be embedded in the media signal 102. The starting phase determiner 214 of the illustrated example determines a common starting phase value for a plurality of watermark components based on a bit value (e.g., as determined by the bit value determiner 206). The starting phase determiner 214 can be configured with a plurality of pre-determined phase values that correspond to specific bit values. For example, if the bit value determiner 206 conveys that the starting phase is to carry a bit value of "1," and the bit value of "1" corresponds to a starting phase value of g, the starting phase determiner 214 determines that a plurality of watermark components should have a starting phase value of π, and communicates this starting phase value to the component generator 216. In some examples, the number of watermark components that are required to carry a same starting phase value to convey the bit value is determined based on a pre-configured setting.

During the decoding process (e.g., at the watermark decoder 116), a minimum of two watermark components with a common starting phase value are required to determine the starting phase. It is not possible to determine when a watermark component begins by looking at phase values for only one watermark component since sampling occurs constantly and the watermark decoder 116 does not know when and where watermark components are embedded. In the illustrated example, the starting phase determiner 214 sets the starting phase value for watermark components embedded at the same time to a same starting phase value.

While a minimum of two watermark components are required to determine a starting phase value, the starting phase determiner 214 can utilize a larger number of watermark components to carry the starting phase information. The accuracy with which the starting phase value can be determined increases with the number of watermark components embedded with a common starting phase. For example, if the watermark decoder 116 identifies phase convergence of ten watermark components that have the same starting phase value and different frequency characteristics, the watermark decoder 116 can determine with high confidence that the phase at the point of convergence represents the starting phase value. Conversely, if the watermark decoder 116 identifies phase convergence of two watermark components, the confidence with which the starting phase value can be determined is lower. This is further amplified when considering possible noise introduced to the watermarked media signal 108 during broadcasting and/or recording at the media monitor 114, which can make some watermark components difficult to identify.

The component generator 216 of the illustrated example of FIG. 2 generates watermark components based on frequency ranges selected by the frequency selector 210, amplitude values determined by the amplitude determiner 212 for ones of the frequency ranges, and starting phase values determined by the starting phase determiner 214. After embedding the watermark components representing the watermark symbol into the media signal 102, the component generator 216 outputs the watermarked media signal 108. For example, the component generator 216 may output the watermarked media signal 108 to another component of the media distributor 104 (e.g., to transmission equipment to broadcast the watermarked media signal 108).

In operation, the media signal 102 is accessed by the media signal accessor 202 to initiate the encoding process. The watermark symbol and auxiliary information accessor 204 accesses one or more watermark symbols and auxiliary information to be encoded into the media signal 102, and the bit value determiner 206 determines specific bit values for watermark components to be embedded representing the watermark symbol(s). The watermark component configurator 208 then determines specific parameters of the watermark components to be embedded. The frequency selector 210 selects appropriate frequency ranges at which to embed the watermark components, and the amplitude determiner 212 determines amplitude values for the watermark components based on bit values indicated by the bit value determiner 206. The starting phase determiner 214 similarly determines a starting phase value for a set of watermark components based on one or more bit value(s) indicated by the bit value determiner 206. The component generator 216 then utilizes the frequency, amplitude, and starting phase values to embed watermarks into the media signal 102 and generate the watermarked media signal 108.

While an example manner of implementing the watermark encoder 106 of FIG. 1 is illustrated in FIG. 2, one or more of the elements, processes and/or devices illustrated in FIG. 2 may be combined, divided, re-arranged, omitted, eliminated and/or implemented in any other way. Further, the example media signal accessor 202, the example watermark symbol and auxiliary information accessor 204, the example bit value determiner 206, the example watermark component configurator 208, the example frequency selector 210, the example amplitude determiner 212, the example starting phase determiner 214, the example component generator 216 and/or, more generally, the example watermark encoder 106 of FIG. 2 may be implemented by hardware, software, firmware and/or any combination of hardware, software and/or firmware. Thus, for example, any of the example media signal accessor 202, the example watermark symbol and auxiliary information accessor 204, the example bit value determiner 206, the example watermark component configurator 208, the example frequency selector 210, the example amplitude determiner 212, the example starting phase determiner 214, the example component generator 216 and/or, more generally, the example watermark encoder 106 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example media signal accessor 202, the example watermark symbol and auxiliary information accessor 204, the example bit value determiner 206, the example watermark component configurator 208, the example frequency selector 210, the example amplitude determiner 212, the example starting phase determiner 214, the example component generator 216 and/or, more generally, the example watermark encoder 106 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example watermark encoder 106 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
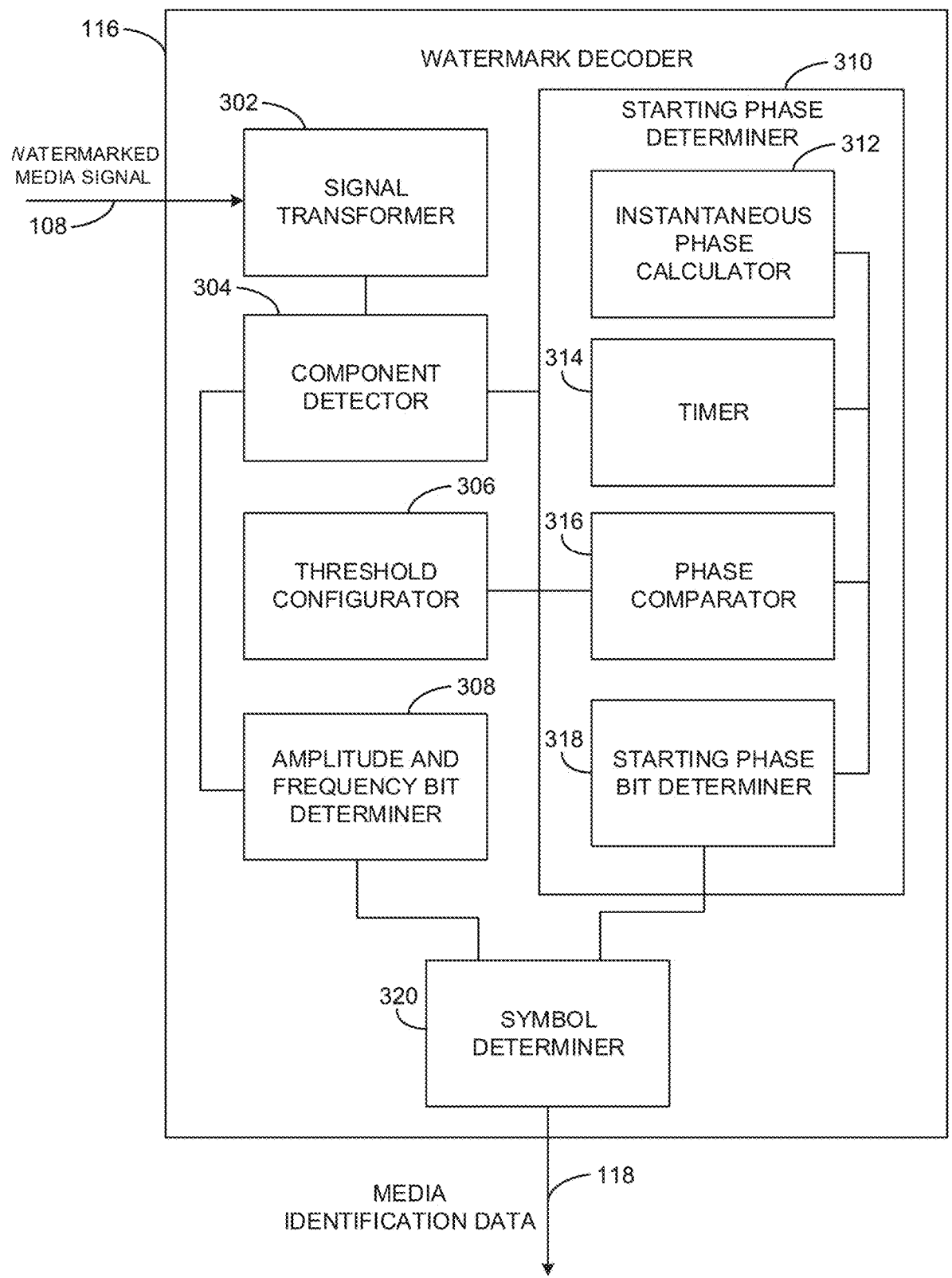
FIG. 3 is a block diagram of the example watermark decoder of FIG. 1 to decode watermarks encoded utilizing starting phase modulation in accordance with the teachings of this disclosure.

FIG. 3 is a block diagram of the example watermark decoder 116 of FIG. 1 to decode watermarks utilizing starting phase modulation in accordance with the teachings of this disclosure. The watermark decoder 116 includes an example signal transformer 302, an example component detector 304, an example threshold configurator 306, an example amplitude and frequency bit determiner 308, an example starting phase determiner 310, an example instantaneous phase calculator 312, an example timer 314, an example phase comparator 316, an example starting phase bit determiner 318, and an example payload determiner 320.

The example signal transformer 302 of the illustrated example of FIG. 3 accesses the watermarked media signal 108 and transforms the watermarked media signal 108 to a representation to enable identification of watermarks. For example, the signal transformer 302 can utilize a Fast Fourier Transform (FFT) to convert the watermarked media signal 108 to the frequency domain. The signal transformer 302 converts the watermarked media signal 108 to a form in which it can identify frequency, amplitude, and/or phase characteristics of watermarks encoded in the watermarked media signal 108.

The example component detector 304 of the illustrated example of FIG. 3 detects watermark components in the watermarked media signal 108. The component detector 304 of the illustrated example analyzes amplitude values of frequency ranges in the watermarked media signal 108 which are known to be associated with watermark components and determines whether the watermarked media signal 108 is boosted in one or more of these frequency ranges. In some examples, the component detector 304 analyzes numerous frequency ranges (e.g., regardless of whether they are known to sometimes include watermark components) throughout the watermarked media signal 108 and determines whether the amplitude of the watermarked media signal 108 in these ranges represents a boosted amplitude. For example, if the watermarked media signal has a significantly higher amplitude value than frequency ranges surrounding an analyzed frequency range, the watermarked media signal 108 may determine the analyzed frequency range is boosted. In response to the component detector 304 identifying frequency ranges which appear to include boosted signals relative to other portions of the watermarked media signal 108, the component detector 304 of the illustrated example determines watermark components are embedded in the frequency ranges. In some examples, the component detector 304 may analyze amplitude, frequency, and/or phase values of the watermarked media signal 108 in any other manner based on known, detectable characteristics of watermark components. In some examples, the component detector 304 determines a signal strength parameter (e.g., SNR) for watermark components. The component detector 304 communicates information regarding detected watermark components to the amplitude and frequency bit determiner 308 and/or the starting phase determiner 310.

The example threshold configurator 306 of the illustrated example of FIG. 3 stores and provides threshold values to the starting phase determiner 310. The threshold configurator 306 of the illustrated example stores a difference threshold utilized by the phase comparator 316 to determine whether a difference between as sum of differences of phase values relative to a possible starting phase value is small enough to indicate the starting phase matches the possible starting phase value. Further detail of utilization of the difference threshold is described in association with the further discussion of the phase comparator 316 below. In some examples, the threshold configurator 306 includes a signal strength threshold, which can be utilized to select watermark components with the strongest signals (e.g., based on SNR) for determining modulated starting phase values. In some examples, the threshold configurator 306 includes a component detection threshold, which can be utilized by the component detector 304 to determine whether an amplitude value of the watermarked media signal 108 likely indicates the presence of a watermark component.

The example amplitude and frequency bit determiner 308 of the illustrated example of FIG. 3 determines watermark component bit values based on amplitude and frequency characteristics of the watermarked media signal 108. For example, the amplitude and frequency bit determiner 308 of the illustrated example determines amplitude and frequency values for watermarks detected by the component detector 304 and determines bit values associated with the amplitude and frequency. In some examples, the amplitude and frequency bit determiner 308 queries a reference table with amplitude and/or frequency values of the watermark component to determine bit value(s) corresponding to the amplitude and/or frequency values.

The example starting phase determiner 310 of the illustrated example of FIG. 3 determines starting phase values for watermark components and determines bit values corresponding to the starting phase values of the watermark components. The starting phase determiner 310 includes the instantaneous phase calculator 312, the timer 314, the phase comparator 316, and the starting phase bit determiner 318.

The example instantaneous phase calculator 312 of the illustrated example of FIG. 3 calculates instantaneous phase values for the watermark components detected by the component detector 304. The instantaneous phase calculator 312 accesses a time value corresponding to a current sample period under analysis from the timer 314, and calculates instantaneous phase values for the watermark components detected by the component detector 304 during the sample period. In some examples, the instantaneous phase calculator 312 calculates the instantaneous phase for the watermark components while accounting for phase wrapping. In some examples, the instantaneous phase calculator 312 calculates new instantaneous phase values in response to the timer 314 adjusting the analysis period (e.g., selecting a new analysis time in response to a previous time being determined not to correspond to the start of the watermark component).

The example timer 314 of the illustrated example of FIG. 3 tracks an analysis time when calculating the starting phase value of a plurality of watermark components. For example, in response to an indication by the phase comparator 316 that an analyzed time did not correspond to the start of the watermark component (e.g., due to the sums of differences of instantaneous phase values relative to possible starting phase values not satisfying the difference threshold), the timer 314 of the illustrated example steps back in time by a time step size. In some examples, the timer 314 communicates a new analysis time to the instantaneous phase calculator 312 after adjusting the analysis time. In some examples, the timer 314 determines whether a symbol duration has been analyzed. For example, the timer 314 may compare an amount of time that has been analyzed to a symbol duration threshold (e.g., as configured at the threshold configurator 306). Given that watermark symbols typically persist for a specific, consistent, amount of time, the timer 314 can indicate when an entire symbol duration has been analyzed without the phase comparator 316 determining that the difference threshold was satisfied. In some such examples, in response to the duration threshold being satisfied, processing can conclude. The starting phase bit determiner 318 can determine that no starting phase bit was conveyed in the watermark component due to the starting phase numerical solution not converging at any time in an entire watermark symbol duration.

The example phase comparator 316 of the illustrated example of FIG. 3 calculates sums of differences of instantaneous watermark values (e.g., calculated by the instantaneous phase calculator 312) relative to possible starting phase values, and compares these sums to a difference threshold. The phase comparator 316 of the illustrated example accesses a plurality of possible starting phase values. In some examples, the phase comparator 316 determines the possible starting phase values via the starting phase bit determiner 318. The possible starting phase values are pre-determined phase values which the watermark encoder 106 utilizes to convey a bit value in the watermark components. For example, to encode a bit of "0," a starting phase value of "0" may be used when generating watermark components. Similarly, for example, to encode a bit of "1," a starting phase value of "$\pi$" may be used when generating watermark components. Thus, the starting phase determiner 214 calculates differences between instantaneous phase values and the known, pre-determined, possible starting phase values that correspond to bits (e.g., 0, $\pi$, $-\pi$, etc.). Any mapping of bits and starting phase values can be utilized to encode the watermark components (e.g., any number of unique bits can be utilized corresponding to a same number of unique starting phase values).

In some examples, the phase comparator 316 continues to calculate sums of differences between instantaneous phase values and possible starting phase values at different analysis times until one of the sums of differences between instantaneous phase values and possible starting phase values satisfies the difference threshold. For example, if a known bit of "0" can be represented in the watermark symbols with a starting phase value of "0," the phase comparator 316 of the illustrated example calculates difference values between each watermark component "0" at a current analysis time. The difference values for all of the watermark components are then summed. If this sum of differences value becomes sufficiently small, such that it satisfies the difference threshold (e.g., is less than the difference threshold), then the phase comparator 316 determines that it has arrived at a starting phase value, and indicates to the starting phase bit determiner 318 that the sum of differences relative to "0" satisfied the difference threshold. In such an example, in response to satisfying the difference threshold, the starting phase bit determiner 318 then selects the bit corresponding to the "0" starting phase value. The phase comparator 316 may utilize any other types of calculations to compare phase values of the watermark components with possible starting phase values, and/or to compare instantaneous phase values of the watermark components with each other, to determine a starting phase value for the watermark components.

The example starting phase bit determiner 318 of the illustrated example of FIG. 3 determines a starting phase bit in response to one of the sums of differences of instantaneous phase values relative to a possible starting phase value satisfying the difference threshold. In response to an indication from the phase comparator 316 that one of the aforementioned sums has satisfied the difference threshold, the starting phase bit determiner 318 of the illustrated example determines the starting phase value of the watermark components to be the possible starting phase value indicated in the sum term. For example, if the sum of differences relative to a starting phase value of "0" satisfied the difference threshold, then the starting phase value is determined to be "0." In such an example, the starting phase bit determiner 318 determines that the starting phase of the watermark components conveys a bit corresponding to a starting phase value of "0" (e.g., as indicated in a table, or other reference location). The starting phase bit determiner 318 of the illustrated example communicates the starting phase bit to the payload determiner 320, to determine auxiliary information corresponding to the starting phase bit. Example code describing the above-mentioned calculations performed by the instantaneous phase calculator 312, the timer 314, the phase comparator 316, and the starting phase bit determiner 318 is illustrated and described in association with FIG. 6.

The payload determiner 320 of the illustrated example of FIG. 3 determines one or more watermark symbol(s) and/or auxiliary information embedded in the watermarked media signal 108. In some examples, the payload determiner 320 of the illustrated example determines a watermark symbol based on bits communicated by the amplitude and frequency bit determiner 308, and auxiliary information based on one or more bits from the starting phase bit determiner 318. In some examples, the starting phase bit may be part of a watermark symbol. In some examples, the payload determiner 320 queries the bits communicated by the amplitude and frequency bit determiner 308 and/or the starting phase bit determiner 318 against a reference database for decoding watermark symbols to generate the media identification data 118. In some examples, the payload determiner 320 communicates the bit values and/or another representation of the watermark symbol to the AME 120 for subsequent interpretation.

While an example manner of implementing the watermark decoder 116 of FIG. 1 is illustrated in FIG. 3, one or more of the elements, processes and/or devices illustrated in FIG. 3 may be combined, divided, re-arranged, omitted, eliminated and/or implemented in any other way. Further, the example signal transformer 302, the example component detector 304, the example threshold configurator 306, the example amplitude and frequency bit determiner 308, the example starting phase determiner 310, the example instantaneous phase calculator 312, the example timer 314, the example phase comparator 316, the example starting phase bit determiner 318, the example payload determiner 320 and/or, more generally, the example watermark decoder 116 of FIG. 3 may be implemented by hardware, software, firmware and/or any combination of hardware, software and/or firmware. Thus, for example, any of the example signal transformer 302, the example component detector 304, the example threshold configurator 306, the example amplitude and frequency bit determiner 308, the example starting phase determiner 310, the example instantaneous phase calculator 312, the example timer 314, the example phase comparator 316, the example starting phase bit determiner 318, the example payload determiner 320 and/or, more generally, the example watermark decoder 116 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example signal transformer 302, the example component detector 304, the example threshold configurator 306, the example amplitude and frequency bit determiner 308, the example starting phase determiner 310, the example instantaneous phase calculator 312, the example timer 314, the example phase comparator 316, the example starting phase bit determiner 318, the example payload determiner 320 and/or, more generally, the example watermark decoder 116 is/are hereby expressly defined to include a non-transitory computer readable storage device or storage disk such as a memory, a digital versatile disk (DVD), a compact disk (CD), a Blu-ray disk, etc. including the software and/or firmware. Further still, the example watermark decoder 116 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
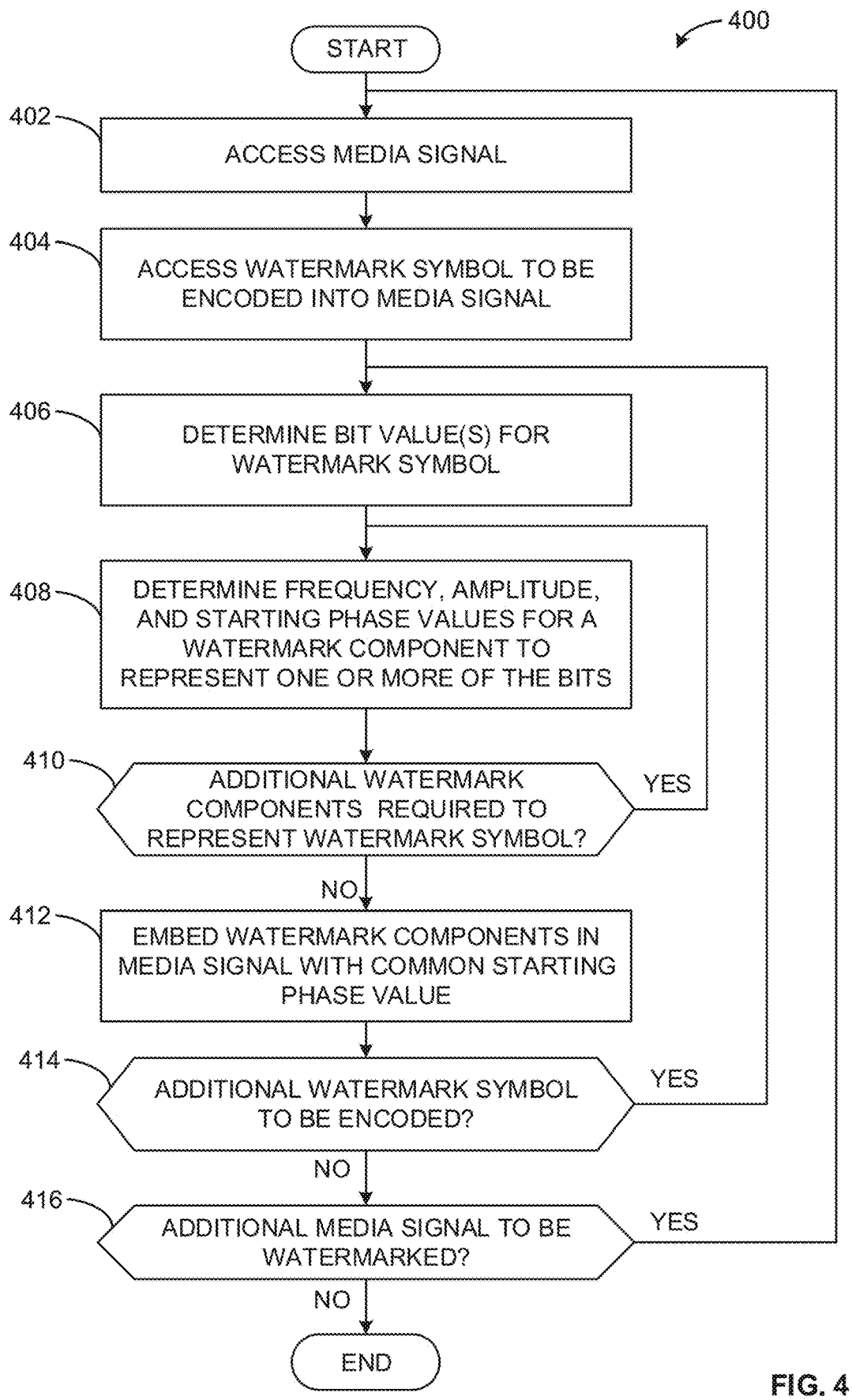
FIG. 4 is a flowchart representative of machine readable instructions that may be executed to implement the watermark encoder of FIGS. 1 and 2 to encode media signals with watermarks using starting phase modulation.

A flowchart representative of example hardware logic, machine readable instructions, hardware implemented state machines, and/or any combination thereof for implementing the watermark encoder 106 of FIG. 2 is shown in FIG. 4. The machine readable instructions may be an executable program or portion of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 4, many other methods of implementing the example watermark encoder 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone. (4) A with B, (5) A with C, (6) B with C, and (7) A with B and with C. As used herein in the context of describing structures, components, items, objects and/or things, the phrase "at least one of A and B" is intended to refer to implementations including any of (1) at least one A. (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B. and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B. and (3) at least one A and at least one B.

Example machine readable instructions 400 that may be executed by the watermark encoder 106 of FIGS. 1 and 2 to encode media signals with watermarks using starting phase modulation are illustrated in FIG. 4. With reference to the preceding figures and associated descriptions, the example machine readable instructions 400 of FIG. 4 begin with the example watermark encoder 106 accessing the media signal 102 (Block 402). In some examples, the media signal accessor 202 accesses the media signal 102.

At block 404, the example watermark encoder 106 accesses a watermark symbol and auxiliary information to be encoded into the media signal 102. In some examples, the watermark symbol and auxiliary information accessor 204 accesses the watermark symbol and/or auxiliary information to be encoded into the media signal.

At block 406, the example watermark encoder 106 determines one or more bit value(s) corresponding to the watermark symbol and auxiliary information. In some examples, the bit value determiner 206 determines one or more bit value(s) corresponding to the watermark symbol and auxiliary information.

At block 408, the example watermark encoder 106 determines frequency, amplitude, and starting phase values for a watermark component to represent one or more of the bits. In some examples, the watermark component configurator 208 determines frequency, amplitude, and starting phase values for the watermark component to represent one or more of the bits. For example, the frequency selector 210 selects frequency ranges in which to embed the watermark components, the amplitude determiner 212 determines amplitude values for the watermark components, and the starting phase determiner 214 determines a starting phase value for the watermark components.

At block 410, the example watermark encoder 106 determines whether additional watermark components are required to represent the watermark symbol. In some examples, the watermark symbol and auxiliary information accessor 204 and/or the bit value determiner 206 determine whether additional watermark components are required to represent the watermark symbol. In response to additional watermark components being required to represent the watermark symbol, processing transfers to block 408. Conversely, in response to additional watermark components not being required to represent the watermark symbol, processing transfers to block 412.

At block 412, the example watermark encoder 106 embeds watermark components in the media signal 102 with a common (e.g., same) starting phase value. In some examples, the component generator 216 embeds the watermark components in the media signal 102 utilizing a starting phase value determined by the starting phase determiner 214.

At block 414, the example watermark encoder 106 determines whether additional watermark symbols are to be encoded. In some examples, the watermark symbol and auxiliary information accessor 204 determines whether there are additional watermark symbols to be encoded into the media signal 102. In response to there being additional watermark symbols to be encoded, processing transfers to block 406. Conversely, in response to there not being additional watermark symbols to be encoded, processing transfers to block 416.

At block 416, the example watermark encoder 106 determines whether additional media signals are to be watermarked. In some examples, the media signal accessor 202 determines whether there are additional media signals to be watermarked. In response to there being additional media signal(s) to be encoded, processing transfers to block 406. Conversely, in response to there not being additional media signal(s) to be encoded, processing terminates.

Figure 5A:
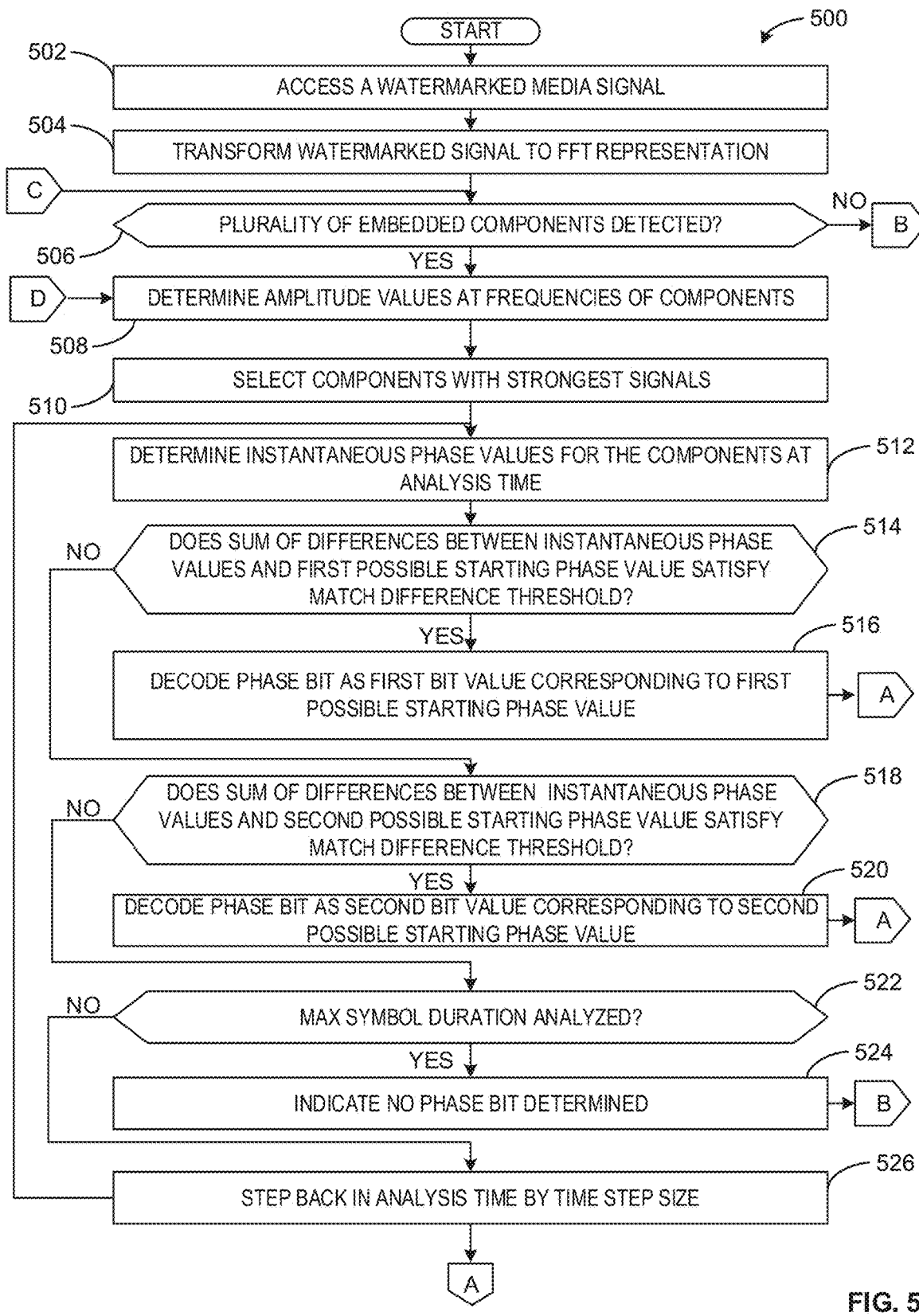
FIGS. 5A-5B are a flowchart representative of machine readable instructions that may be executed to implement the watermark decoder of FIGS. 1 and 3 to decode watermarks encoded using starting phase modulation.
Figure 5B:
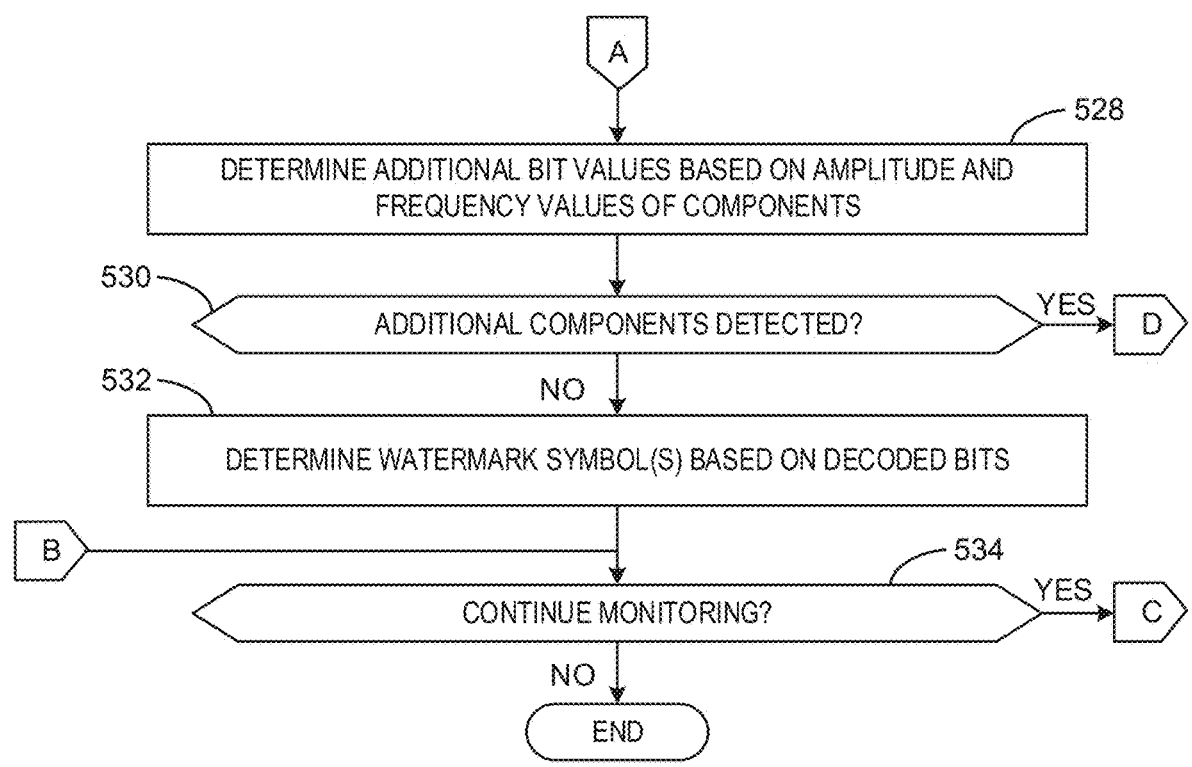

A flowchart representative of example hardware logic, machine readable instructions, hardware implemented state machines, and/or any combination thereof for implementing the watermark decoder 116 of FIG. 3 is shown in FIGS. 5A-5B. The machine readable instructions may be an executable program or portion of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIGS. 5A-5B, many other methods of implementing the example watermark decoder 116 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Example machine readable instructions 500 that may be executed by the watermark decoder 116 of FIG. 3 to decode watermarks utilizing starting phase modulation are illustrated and described in association with FIGS. 5A-5B. With reference to the preceding figures and associated descriptions, the example machine readable instructions 500 of FIGS. 5A-5B begin with the example watermark decoder 116 accessing a watermarked media signal (Block 502). In some examples, the signal transformer 302 accesses the watermarked media signal 108.

At block 504, the example watermark decoder 116 transforms the watermarked media signal 108 to a frequency domain representation. In some examples, the signal transformer 302 transforms the watermarked media signal 108 to a frequency domain representation, or another representation of the watermarked media signal 108 to enable detection and decoding of watermarks.

At block 506, the example watermark decoder 116 determines whether a plurality of embedded watermark components have been detected. In some examples, the component detector 304 determines whether a plurality of embedded watermark components have been detected. In response to a plurality of embedded watermark components being detected, processing transfers to block 508. Conversely, in response to a plurality of embedded watermark components not being detected, processing transfers to block 534 of FIG. 5B.

At block 508, the example watermark decoder 116 determines amplitude values at frequencies of the watermark components. In some examples, the amplitude and frequency bit determiner 308 determines amplitude values at frequency ranges of the watermark components.

At block 510, the example watermark decoder 116 selects watermark components with the strongest signals (e.g., the highest SNR values). In some examples, the starting phase determiner 310 selects watermark components in the watermarked media signal 108 that have the highest SNR values to enable accurate determination of the starting phase of the watermark components. In some examples, the starting phase determiner 310 compares SNR values or other signal-strength parameters to a signal strength threshold accessed from the threshold configurator 306 to select watermarks with sufficiently high signal strength to enable detection of the starting phase value.

At block 512, the example watermark decoder 116 determines instantaneous phase values for the watermark components at the analysis time. In some examples, the instantaneous phase calculator 312 determines instantaneous phase values for the watermark components at the analysis time.

At block 514, the example watermark decoder 116 determines whether a sum of differences between the instantaneous phase values and a first possible starting phase value satisfies a match difference threshold. In some examples, the phase comparator 316 determines whether the sum of differences between the instantaneous phase values and the first possible starting phase value satisfies the match difference threshold. In response to the sum of differences between the instantaneous phase values and the first possible starting phase value satisfying the match difference threshold, processing transfers to block 516. Conversely, in response to the sum of differences between the instantaneous phase values and the first possible starting phase value not satisfying the match difference threshold, processing transfers to block 518.

At block 516, the example watermark decoder 116 decodes a phase bit as a first bit value corresponding to the first possible starting phase value. In some examples, the starting phase bit determiner 318 decodes the phase bit as the first bit value corresponding to the first possible starting phase value.

At block 518, the example watermark decoder 116 determines whether a sum of differences between the instantaneous phase values and a second possible starting phase value satisfies a match difference threshold. In some examples, the phase comparator 316 determines whether the sum of differences between the instantaneous phase values and the second possible starting phase value satisfies the match difference threshold. In response to the sum of differences between the instantaneous phase values and the second possible starting phase value satisfying the match difference threshold, processing transfers to block 520. Conversely, in response to the sum of differences between the instantaneous phase values and the second possible starting phase value not satisfying the match difference threshold, processing transfers to block 522.

At block 520, the example watermark decoder 116 decodes a phase bit as a second bit value corresponding to the second possible starting phase value. In some examples, the starting phase bit determiner 318 decodes the phase bit as the second bit value corresponding to the second possible starting phase value.

At block 522, the example watermark decoder 116 determines whether a max symbol duration has been analyzed. In some examples, the timer 314 determines whether the max symbol duration has been analyzed. In response to the max symbol duration having been analyzed, processing transfers to block 524. Conversely, in response to the max symbol duration not having been analyzed, processing transfer to block 526.

At block 524, the example watermark decoder 116 steps back in analysis time by a time step size. In some examples, the timer 314 steps back in analysis time by the time step size.

The example machine readable instructions 500 continue in FIG. 5B. With reference to the preceding figure sand the associated descriptions, the example machine readable instructions continue with the example watermark decoder 116 determining additional bit values based on amplitude and frequency values of the watermark component(s) (Block 528). In some example, the amplitude and frequency bit determiner 308 determines additional bit values based on amplitude and frequency values of the watermark component(s).

At block 530, the example watermark decoder 116 determines whether additional watermark components have been detected. In some examples, the component detector 304 determines whether additional watermark components have been detected. In response to additional watermark components being detected, processing transfers to block 508 of FIG. 5A. Conversely, in response to additional watermark components not being detected, processing transfers to block 532.

At block 532, the example watermark decoder 116 determines a payload including watermark symbol(s) and/or auxiliary information based on decoded bits. In some examples, the payload determiner 320 determines a payload including watermark symbol(s) and/or auxiliary information based on decoded bits. For example, the payload may be the sum of information represented by the decoded bits.

At block 534, the example watermark decoder 116 determines whether to continue monitoring. In response to continuing monitoring, processing transfers to block 506 of FIG. 5A. Conversely, in response to not continuing monitoring, processing terminates.

FIG. 6 is example code 600 for implementing the watermark decoding process described in connection with FIGS. 5A-5B. The code 600 represents merely one example implementation of the watermark decoding process. In some examples, the code 600 is implemented by the watermark decoder 116. For clarity, the code 600 is described in an example first portion 602, an example second portion 604, an example third portion 606, an example forth portion 608, an example fifth portion 610, an example sixth portion 612, and an example seventh portion 614.

The example first portion 602 establishes two minimum sum of differences variables, Q0 and Q1. Each of the minimum sum of differences terms corresponds to a possible starting phase value (e.g., 0, π, etc.) and tracks the minimum encountered sum of difference terms calculated in the fourth portion 608. Therefore, for each possible starting phase value that the watermark encoder 106 utilizes to convey a unique bit value, a sum of differences term is established. The minimum sum of differences variables are set to infinity, as they are intended to start at a high number and then to be updated each time a new minimum sum of difference term is calculated in the fourth portion 608. In some examples, the phase comparator 316 establishes the sum of differences variables.

The example second portion 604 establishes a while-loop, wherein numerous operations run as long as a current analysis time value ("t") remains positive (e.g., >0). The first operation in the while-loop is to decrement the current analysis time by a time step size ("δt"), thereby stepping back in time to re-calculate instantaneous phase terms and sum of differences terms until a terminating condition is met (e.g., the "break" in the fifth portion 610). In some examples, the timer 314 establishes the current analysis time value and decrements the current time value each iteration.

The example third portion 606 calculates instantaneous phase values ("$\Phi_i(t)$") for the watermark components as a function of the current analysis time ("t"). For each watermark component, the current phase value can be calculated based on the frequency value of the watermark component ("$f_i$") and the time step size ("δt"). In some examples, the current phase value is initiated in the first portion 602 by calculating a phase value at a first analysis time, thus enabling the simplified calculation shown in the third portion 606. In some examples, the instantaneous phase calculator 312 updates the instantaneous phase values.

The example forth portion 608 calculates a first sum of differences term relative to a starting phase value of 0 ("$Q(t,\Phi_o=0)$") and a second sum of differences term relative to a starting phase value of g ("$Q(t,\Phi_o=\pi)$") utilizing the aforementioned variable definitions for "t" and "$\Phi_i(t)$." In some examples, the calculation of the first sum of differences term is more complicated due to the effect of phase wrapping on phase values around 0. In some such examples, a minimum of the differences calculated between 0 and $2\pi$ is calculated to eliminate the effect of phase wrapping on the usefulness of the sum term.

The example fifth portion 610 determines if either the first sum of differences term or the second sum of differences term satisfies the difference threshold ($Q_{min}$). In response to either term satisfying the difference threshold, the "break" command causes processing to exit the while-loop and proceed to the seventh portion 614. In some examples, the phase comparator 316 determines whether the first or second sum of differences terms satisfy the difference threshold.

The example sixth portion 612 updates Q1 and Q0 values utilized to track the lowest encountered sum of differences term for the first possible starting phase value and the second possible starting phase value. For example, if the current first sum of differences term (e.g., relative to the starting phase value of 0) is less than the lowest encountered sum of differences term for the first possible starting phase value, then Q0 is set the current first sum of differences term. The same operation is performed with Q1 to track the minimum second sum of differences term (e.g., relative to the starting phase value of π). In some examples, the phase comparator 316 updates the minimum encountered sum of differences terms (Q0, Q1).

The example seventh portion 614 determines, after exiting the while loop (e.g., in response to satisfying the difference threshold) whether a first bit value or a second bit value is embedded in the watermarked media signal 108. If, after exiting the while-loop, the first sum of differences minimum term (Q0) is less than the second sum of differences minimum term (Q1), the bit value is set to 0 (e.g., a bit value corresponding to the starting phase value utilized in calculating the first sum of differences term, 0). Conversely, if the second sum of differences minimum term (Q1) is less than the first sum of differences minimum term, the bit value is set to 1 (e.g., a bit value corresponding to the starting phase value utilized in calculating the second sum of differences term, a). In some examples, the starting phase bit determiner 318 determines the bit value.

Figure 7:
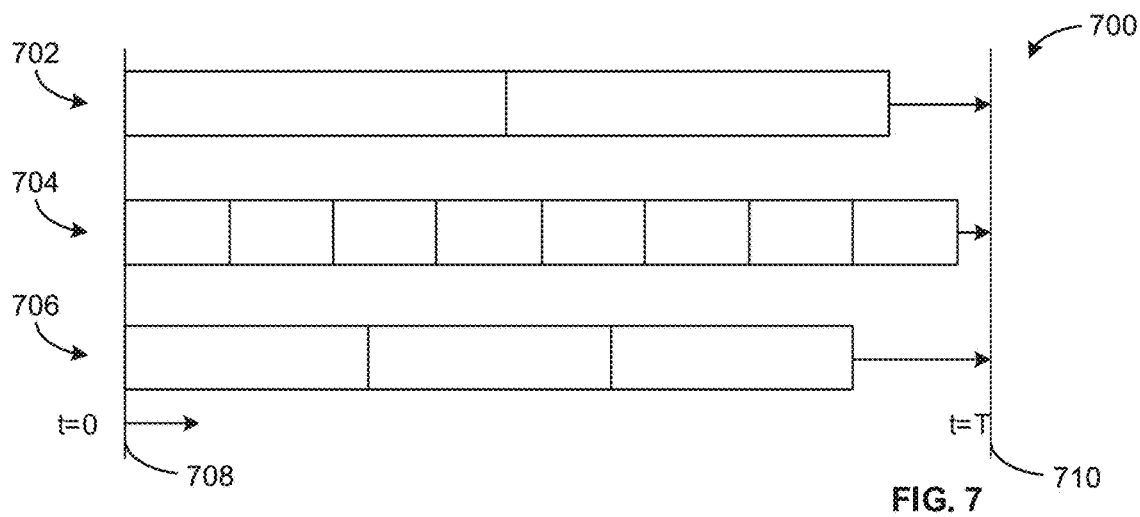
FIG. 7 is a schematic illustrating multiple watermark components having different frequencies but a common starting phase value.

FIG. 7 is an example schematic 700 illustrating multiple watermark components having different frequencies but a common starting phase value. The schematic 700 includes an example first watermark component 702, an example second watermark component 704, and an example third watermark component 706. Vertical lines in each of the watermark components indicate times where the phase of the respective watermark component reaches its starting phase value. Thus, at an example first time 708, when all of the watermark components are initiated with the same starting phase value, the phase of each of the first, second, and third watermark components 702, 704, 706 matches. However, as is apparent in the schematic 700, the first watermark component 702 has a relatively low frequency (e.g., two full cycles are completed throughout the schematic 700), the third watermark component 706 has a somewhat greater frequency (e.g., three full cycles are completed throughout the schematic 700), and the second watermark component has an even greater frequency (e.g., eight full cycles are completed throughout the schematic 700).

When decoding the watermark components to determine a bit represented in the starting phase value of the first, second, and third watermark components 702, 704, 706, the starting time of the watermark components (e.g., the first time 708) must be determined. For example, if analysis of the phase values is performed at an example second time 710, the phase values of the first, second, and third watermark components 702, 704, 706 will not match and will not correspond to the starting phase value. To determine the starting phase value, and calculate the bit conveyed by the starting phase value, the watermark decoder 116 must incrementally step back in time until it arrives at (or arrives sufficiently near to satisfy the difference threshold) the first time 708.

Figure 8:
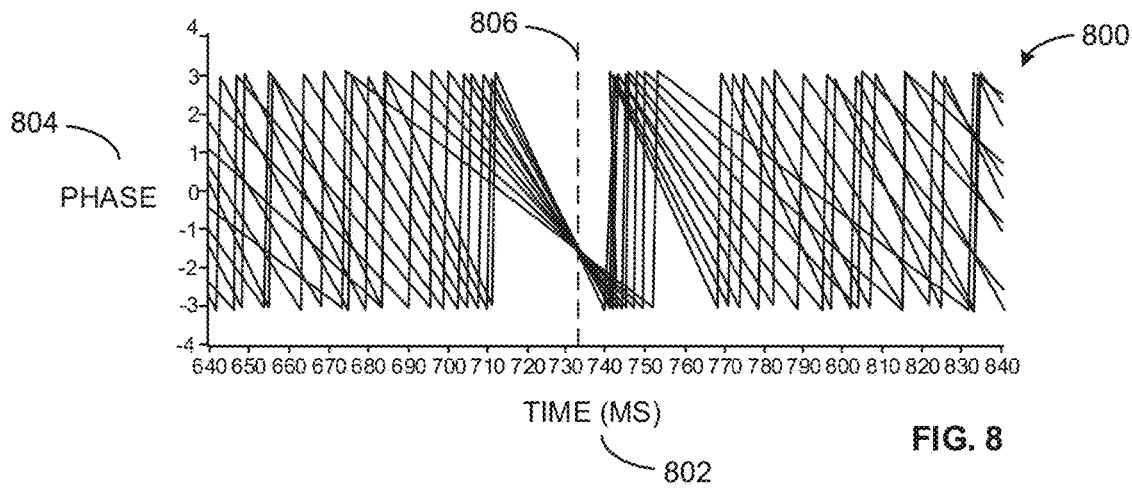
FIG. 8 is an example phase plot of a plurality of watermark components having a common starting phase value.

FIG. 8 is an example phase plot 800 of a plurality of watermark components having a common starting phase value. The phase plot 800 includes an example time axis 802 (e.g., the x-axis) and an example phase axis 804 (e.g., the y-axis). A plurality of watermark components are plotted on the phase plot 800. Ones of the watermark components are represented in the phase plot 800 as separate, continuous lines. As is apparent, the watermark components have different frequencies, and thus, aside from at an example starting phase time 806, the instantaneous phase values for these watermark components are highly dispersed. Prior to the starting phase time 806, the watermark components are not yet embedded, and thus the frequency range values that will carry the watermark components exhibit disparate phase values. At the starting phase time 806, all of the watermark components exhibit a phase value of approximately −1.5. Thus, the watermark encoder 106 is configured with a phase value of −1.5 corresponding to a bit value, and the watermark decoder 116 is informed that −1.5 is one possible starting phase value for the watermark components. Following the starting phase time 806, the differing frequencies of the watermark components cause the instantaneous phase values to diverge, and for the remainder of the plot the phase values of the numerous watermark components do not converge.

When analyzing these tones to determine a starting phase value (e.g., to determine a bit conveyed by the starting phase value), the watermark decoder 116 must step back in time until arriving at the starting phase time 806 (e.g., approximately 733 ms), where the sum of differences between the watermark components and the known possible starting phase value (−1.5) satisfies the difference threshold.

Figure 9:
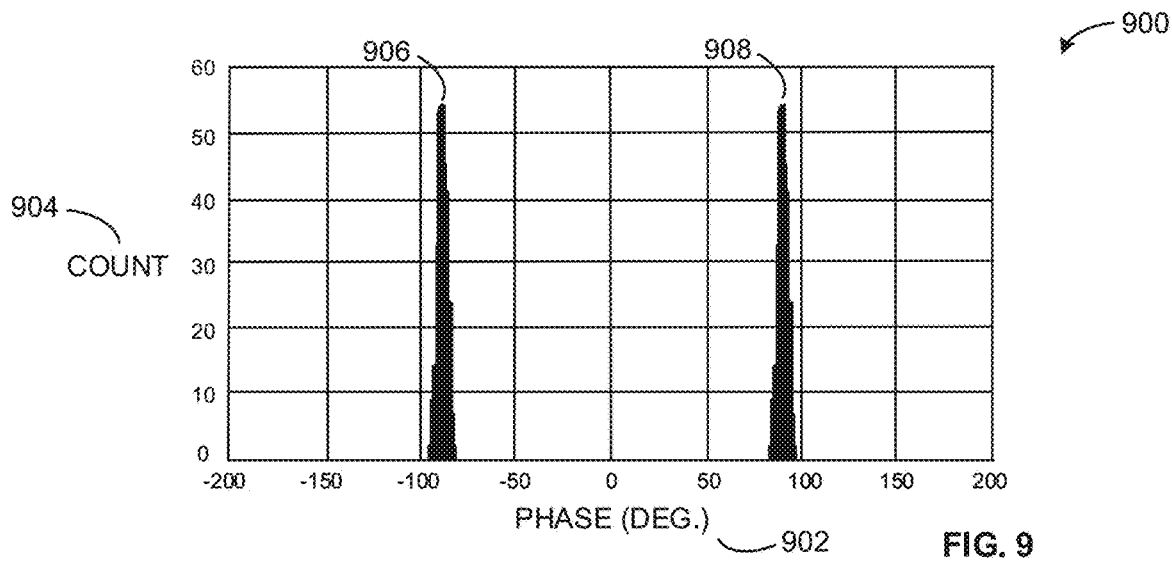
FIG. 9 is an example phase distribution plot illustrating convergence of numerical methods to determine watermark starting phase as described herein.

FIG. 9 is an example phase distribution plot 900 illustrating convergence of numerical methods to determine watermark starting phase as described herein. The phase distribution plot 900 illustrates phase in degrees at a time when one of the sum of difference values satisfies the difference threshold. The phase values are illustrated on an example horizontal axis 902 and a count of a number of instances a starting phase angle was identified is illustrated on an example vertical axis 904. The phase distribution plot 900 depicts analyses of a plurality of encoded watermarks. Some of the watermarks include watermark components that carry a starting phase value of $\pi/2$, while others include watermark components that carry a starting phase value of $-\pi/2$. Thus, all of the watermark symbols analyzed had watermark components embedded with one of these two starting phase values to carry a bit value. The phase distribution plot 900 illustrates an example first peak 906 centered at $-\pi/2$, with a relatively small distribution of phase values of plus or minus ten degrees, and an example second peak 908 centered at $\pi/2$, with a similarly small distribution of phase values. It is important to note that the phase distribution plot 900 shows the phase value of the watermark components at the time when the sum of difference term satisfied the difference threshold. Thus, the phase distribution plot illustrates that the phase values at the time when the threshold is satisfied are in the vicinity of the selected starting phase values.

Figure 10:
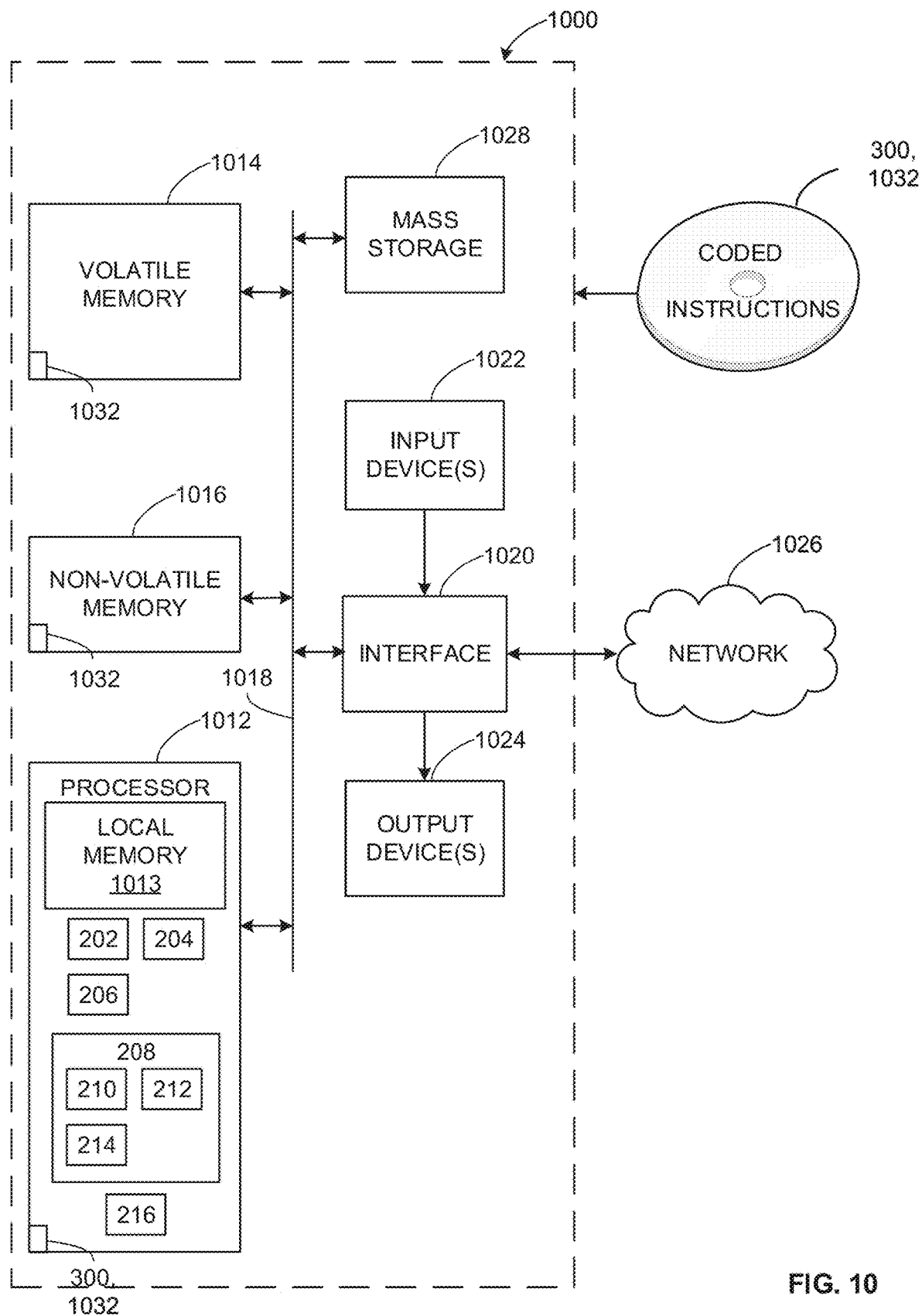
FIG. 10 is a block diagram of an example processor platform structured to execute the example machine readable instructions of FIG. 4 to implement the example watermark encoder of FIGS. 1-2.

FIG. 10 is a block diagram of an example processor platform 1000 structured to execute the instructions of FIG. 4 to implement the watermark encoder 106 of FIGS. 1 and 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1012 implements the example media signal accessor 202, the example watermark symbol and auxiliary information accessor 204, the example bit value determiner 206, the example watermark component configurator 208, the example frequency selector 210, the example amplitude determiner 212, the example starting phase determiner 214, and/or the example component generator 216.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM). RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032, 400 of FIG. 4 may be stored in the mass storage device 1028, in the volatile memory 1014, in the non-volatile memory 1016, and/or on a removable non-transitory computer readable storage medium such as a CD or DVD.

Figure 11:
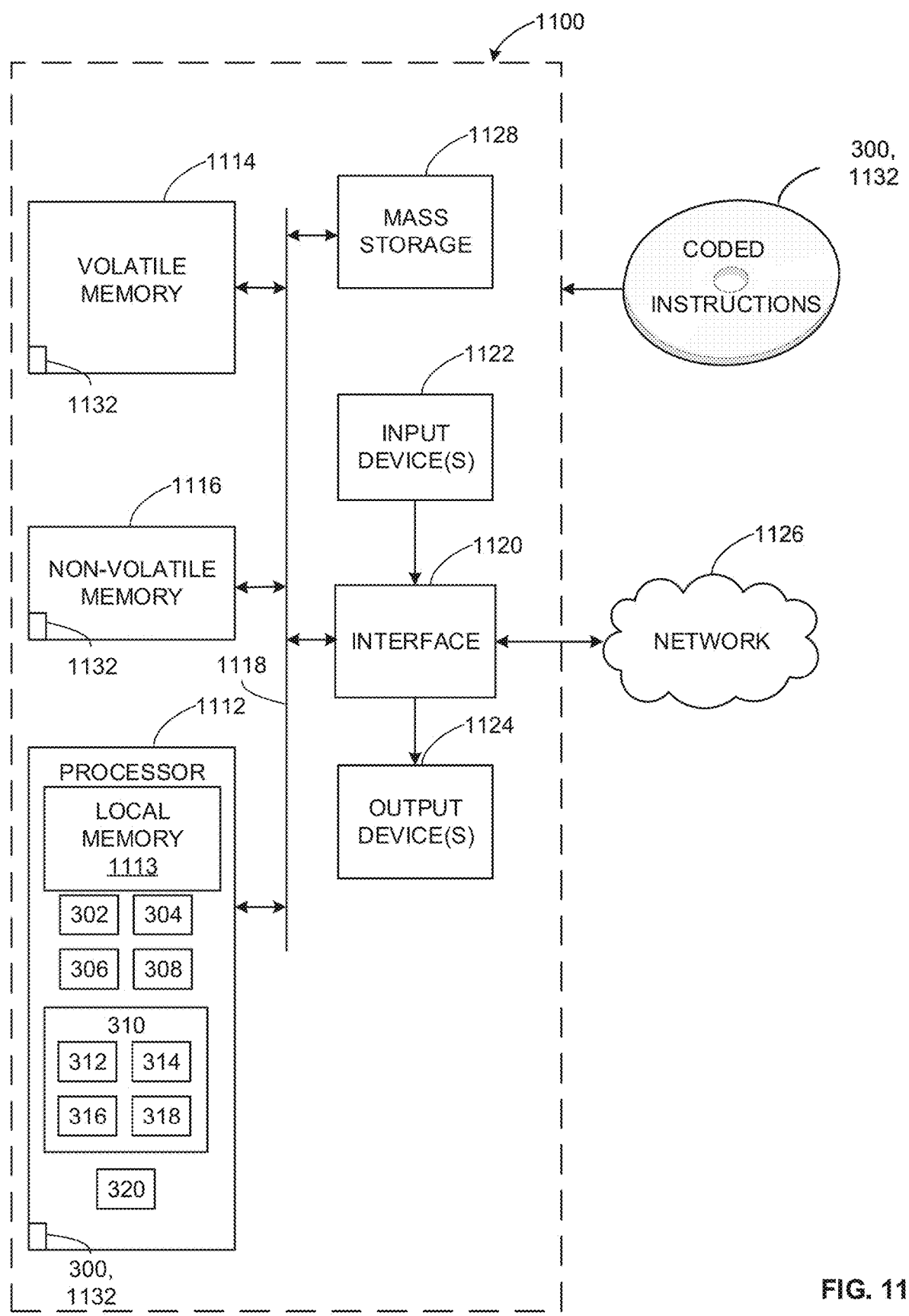
FIG. 11 is a block diagram of an example processor platform structured to execute the example machine readable instructions of FIGS. 5A-5B to implement the example watermark decoder of FIGS. 1 and 3.

FIG. 11 is a block diagram of an example processor platform 1000 structured to execute the instructions of FIGS. 5A-5B to implement the watermark decoder 116 of FIGS. 1 and 3. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example media signal accessor 202, the example watermark symbol and auxiliary information accessor 204, the example bit value determiner 206, the example watermark component configurator 208, the example frequency selector 210, the example amplitude determiner 212, the example starting phase determiner 214, and the example component generator 216.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132, 500 of FIGS. 5A-5B may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that enable phase modulation of watermark components to increase the information capacity of watermarks. Specifically, techniques disclosed herein utilize an existing characteristic of media signals, phase, to carry identifying information without perceptibly altering the audio signal when heard by a listener. Further, techniques disclosed herein overcome complications in analyzing phase due to phase wrapping and changing rates of phase in different frequency ranges by numerically determining a common starting phase value for the watermark components that corresponds to identifying information (e.g., a particular bit). The disclosed methods, apparatus, and articles of manufacture disclosed herein are capable of dramatically increasing the amount of identifying information that can be carried in media signals by increasing the density of information conveyed by a watermark. The disclosed methods, apparatus and articles of manufacture improve the efficiency of using a computing device by enabling more efficient media identification at the computing device through processing of less overall data to convey the same amount of information, or processing of the same amount of data to convey additional information. The disclosed methods, apparatus and articles of manufacture are accordingly directed to one or more improvement(s) in the functioning of a computer.

An example watermark decoding apparatus disclosed herein includes an instantaneous phase calculator to calculate a first instantaneous phase value for a first watermark component of a watermarked media signal at a first time and calculate a second instantaneous phase value for a second watermark component of the watermarked media signal at the first time, a phase comparator to determine a first sum of differences for the first and second instantaneous phase values relative to a first possible starting phase value, and determine a second sum of differences for the first and second instantaneous phase values relative to a second possible starting phase value, a starting phase bit determiner to, in response to one of the first sum of differences or the second sum of differences satisfying a difference threshold, select a corresponding one of the first possible starting phase value or the second possible starting phase value to be a starting phase value, and decode a bit value corresponding to the starting phase value, and a payload determiner to determine a payload based on the bit value and a symbol represented by watermark components including the first watermark component and the second watermark component.

In some examples, the instantaneous phase calculator is to, in response to the first sum of differences and the second sum of differences not satisfying the difference threshold, calculate a third instantaneous phase value of the first component at a second time, the second time prior to the first time, and calculate a fourth instantaneous phase value of the second component at the second time.

In some examples, the phase comparator is to determine a third sum of differences for the third and fourth instantaneous phase values relative to the first possible starting phase value, determine a fourth sum of differences for the third and fourth instantaneous phase values relative to the second possible starting phase value.

In some examples, the starting phase bit determiner is to, in response to one of the third sum of differences or the fourth sum of differences satisfying the difference threshold, select a corresponding one of the first possible starting phase value or the second possible starting phase value to be the starting phase value, and decode the bit value corresponding to the starting phase value.

In some examples, the second time differs from the first time by a time step size. In some examples, the instantaneous phase calculator is to iteratively calculate additional instantaneous phase values of the first watermark component and the second watermark component, and the phase comparator is to iteratively calculate additional sums of differences of the additional instantaneous phase values relative to the first possible starting phase value and the second possible starting phase value until one of the additional sums of differences satisfies the difference threshold.

In some examples, the instantaneous phase calculator is to iteratively calculate additional instantaneous phase values of the first watermark component and the second watermark component, and the phase comparator is to iteratively calculate additional sums of differences of the additional instantaneous phase values relative to the first possible starting phase value and the second possible starting phase value until a symbol duration is reached.

In some examples, the apparatus further includes a watermark component detector to select the first watermark component and the second watermark component for analysis based a first signal strength of the first watermark component and a second signal strength of the second watermark component.

In some examples, to determine the first sum of differences, the phase comparator is to account for phase wrapping.

An example non-transitory computer readable storage medium disclosed herein includes computer readable instructions that, when executed, cause a processor to calculate a first instantaneous phase value for a first watermark component of a watermarked media signal at a first time, calculate a second instantaneous phase value for a second watermark component of the watermarked media signal at the first time, determine a first sum of differences for the first and second instantaneous phase values relative to a first possible starting phase value, determine a second sum of differences for the first and second instantaneous phase values relative to a second possible starting phase value, and in response to one of the first sum of differences or the second sum of differences satisfying a difference threshold: select a corresponding one of the first possible starting phase value or the second possible starting phase value to be a starting phase value, decode a bit value corresponding to the starting phase value, and determine a payload based on the bit value and a symbol represented by watermark components including the first watermark component and the second watermark component.

In some examples, wherein the instructions, when executed, cause the processor to, in response to the first sum of differences and the second sum of differences not satisfying the difference threshold, calculate a third instantaneous phase value of the first component at a second time, the second time prior to the first time, and calculate a fourth instantaneous phase value of the second component at the second time.

In some examples, the instructions, when executed, cause the processor to determine a third sum of differences for the third and fourth instantaneous phase values relative to the first possible starting phase value, and determine a fourth sum of differences for the third and fourth instantaneous phase values relative to the second possible starting phase value.

In some examples, the instructions, when executed, cause the processor to, in response to one of the third sum of differences or the fourth sum of differences satisfying the difference threshold, select a corresponding one of the first possible starting phase value or the second possible starting phase value to be the starting phase value, and decode the bit value corresponding to the starting phase value.

In some examples, the second time differs from the first time by a time step size.

In some examples, the instructions, when executed, cause the processor to iteratively calculate additional instantaneous phase values of the first watermark component and the second watermark component, and iteratively calculate additional sums of differences of the additional instantaneous phase values relative to the first possible starting phase value and the second possible starting phase value until one of the additional sums of differences satisfies the difference threshold.

In some examples, wherein the instructions, when executed, cause the processor to iteratively calculate additional instantaneous phase values of the first watermark component, and iteratively calculate additional sums of differences of the additional instantaneous phase values relative to the first possible starting phase value and the second possible starting phase value until a symbol duration is reached.

In some examples, the instructions, when executed, cause the processor to select the first watermark component and the second watermark component for analysis based a first signal strength of the first watermark component and a second signal strength of the second watermark component.

In some examples, to determine the first sum of differences, the instructions, when executed, cause the processor to account for phase wrapping.

An example method disclosed herein includes calculating a first instantaneous phase value for a first watermark component of a watermarked media signal at a first time, calculating a second instantaneous phase value for a second watermark component of the watermarked media signal at the first time, determining a first sum of differences for the first and second instantaneous phase values relative to a first possible starting phase value, determining a second sum of differences for the first and second instantaneous phase values relative to a second possible starting phase value, in response to one of the first sum of differences or the second sum of differences satisfying a difference threshold, selecting a corresponding one of the first possible starting phase value or the second possible starting phase value to be a starting phase value, decoding a bit value corresponding to the starting phase value, and determining a payload based on the bit value and a symbol represented by watermark components including the first watermark component and the second watermark component.

In some examples, the method includes, in response to the first sum of differences and the second sum of differences not satisfying the difference threshold: calculating a third instantaneous phase value of the first component at a second time, the second time prior to the first time, and calculating a fourth instantaneous phase value of the second component at the second time.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A watermark decoding apparatus comprising:
    an instantaneous phase calculator to:
        calculate a first instantaneous phase value for a first watermark component of a watermarked media signal at a first time;
        calculate a second instantaneous phase value for a second watermark component of the watermarked media signal at the first time;
    a phase comparator to:
        determine a first sum of differences for the first and second instantaneous phase values relative to a first possible starting phase value;
        determine a second sum of differences for the first and second instantaneous phase values relative to a second possible starting phase value;
    a starting phase bit determiner to, in response to one of the first sum of differences or the second sum of differences satisfying a difference threshold:
        select a corresponding one of the first possible starting phase value or the second possible starting phase value to be a starting phase value; and
        decode a bit value corresponding to the starting phase value; and
    a payload determiner to determine a payload based on the bit value and a symbol represented by watermark components including the first watermark component and the second watermark component.

2. The watermark decoding apparatus of claim 1, wherein the instantaneous phase calculator is to:
    in response to the first sum of differences and the second sum of differences not satisfying the difference threshold:
        calculate a third instantaneous phase value of the first component at a second time, the second time prior to the first time; and
        calculate a fourth instantaneous phase value of the second component at the second time.

3. The watermark decoding apparatus of claim 2, wherein the phase comparator is to:
    determine a third sum of differences for the third and fourth instantaneous phase values relative to the first possible starting phase value; and
    determine a fourth sum of differences for the third and fourth instantaneous phase values relative to the second possible starting phase value.

4. The watermark decoding apparatus of claim 3, wherein the starting phase bit determiner is to in response to one of the third sum of differences or the fourth sum of differences satisfying the difference threshold:
    select a corresponding one of the first possible starting phase value or the second possible starting phase value to be the starting phase value; and
    decode the bit value corresponding to the starting phase value.

5. The watermark decoding apparatus of claim 3, wherein the second time differs from the first time by a time step size.

6. The watermark decoding apparatus of claim 5, wherein (1) the instantaneous phase calculator is to iteratively calculate additional instantaneous phase values of the first watermark component and the second watermark component and (2) the phase comparator is to iteratively calculate additional sums of differences of the additional instantaneous phase values relative to the first possible starting phase value and the second possible starting phase value until one of the additional sums of differences satisfies the difference threshold.

7. The watermark decoding apparatus of claim 5, wherein (1) the instantaneous phase calculator is to iteratively calculate additional instantaneous phase values of the first watermark component and the second watermark component and (2) the phase comparator is to iteratively calculate additional sums of differences of the additional instantaneous phase values relative to the first possible starting phase value and the second possible starting phase value until a symbol duration is reached.

8. The watermark decoding apparatus of claim 1, further including a watermark component detector to select the first watermark component and the second watermark component for analysis based a first signal strength of the first watermark component and a second signal strength of the second watermark component.

9. The watermark decoding apparatus of claim 1, wherein to determine the first sum of differences the phase comparator is to account for phase wrapping.

10. A non-transitory computer readable storage medium comprising computer readable instructions that, when executed, cause a processor to:
    calculate a first instantaneous phase value for a first watermark component of a watermarked media signal at a first time;
    calculate a second instantaneous phase value for a second watermark component of the watermarked media signal at the first time;
    determine a first sum of differences for the first and second instantaneous phase values relative to a first possible starting phase value;
    determine a second sum of differences for the first and second instantaneous phase values relative to a second possible starting phase value;
    in response to one of the first sum of differences or the second sum of differences satisfying a difference threshold:

select a corresponding one of the first possible starting phase value or the second possible starting phase value to be a starting phase value;

decode a bit value corresponding to the starting phase value; and determine a payload based on the bit value and a symbol represented by watermark components including the first watermark component and the second watermark component.

11. The non-transitory computer readable storage medium of claim 10, wherein the instructions, when executed, cause the processor to:

in response to the first sum of differences and the second sum of differences not satisfying the difference threshold:

calculate a third instantaneous phase value of the first component at a second time, the second time prior to the first time; and calculate a fourth instantaneous phase value of the second component at the second time.

12. The non-transitory computer readable storage medium of claim 11, wherein the instructions, when executed, cause the processor to:

determine a third sum of differences for the third and fourth instantaneous phase values relative to the first possible starting phase value; and determine a fourth sum of differences for the third and fourth instantaneous phase values relative to the second possible starting phase value.

13. The non-transitory computer readable storage medium of claim 12, wherein the instructions, when executed, cause the processor to, in response to one of the third sum of differences or the fourth sum of differences satisfying the difference threshold:

select a corresponding one of the first possible starting phase value or the second possible starting phase value to be the starting phase value; and decode the bit value corresponding to the starting phase value.

14. The non-transitory computer readable storage medium of claim 12, wherein the second time differs from the first time by a time step size.

15. The non-transitory computer readable storage medium of claim 14, wherein the instructions, when executed, cause the processor to:

iteratively calculate additional instantaneous phase values of the first watermark component and the second watermark component; and iteratively calculate additional sums of differences of the additional instantaneous phase values relative to the first possible starting phase value and the second possible starting phase value until one of the additional sums of differences satisfies the difference threshold.

16. The non-transitory computer readable storage medium of claim 14, wherein the instructions, when executed, cause the processor to:

iteratively calculate additional instantaneous phase values of the first watermark component; and iteratively calculate additional sums of differences of the additional instantaneous phase values relative to the first possible starting phase value and the second possible starting phase value until a symbol duration is reached.

17. The non-transitory computer readable storage medium of claim 10, wherein the instructions, when executed, cause the processor to select the first watermark component and the second watermark component for analysis based a first signal strength of the first watermark component and a second signal strength of the second watermark component.

18. The non-transitory computer readable storage medium of claim 10, wherein to determine the first sum of differences, the instructions, when executed, cause the processor to account for phase wrapping.

19. A watermark decoding method comprising:

calculating a first instantaneous phase value for a first watermark component of a watermarked media signal at a first time;

calculating a second instantaneous phase value for a second watermark component of the watermarked media signal at the first time;

determining a first sum of differences for the first and second instantaneous phase values relative to a first possible starting phase value;

determining a second sum of differences for the first and second instantaneous phase values relative to a second possible starting phase value;

in response to one of the first sum of differences or the second sum of differences satisfying a difference threshold:

selecting a corresponding one of the first possible starting phase value or the second possible starting phase value to be a starting phase value;

decoding a bit value corresponding to the starting phase value; and determining a payload based on the bit value and a symbol represented by watermark components including the first watermark component and the second watermark component.

20. The method of claim 19, further including:

in response to the first sum of differences and the second sum of differences not satisfying the difference threshold:

calculating a third instantaneous phase value of the first component at a second time, the second time prior to the first time; and calculating a fourth instantaneous phase value of the second component at the second time.

* * * * *